United States Patent
Marinet et al.

(10) Patent No.: US 6,997,606 B2
(45) Date of Patent: Feb. 14, 2006

(54) THRESHOLD TEMPERATURE SENSOR COMPRISING ROOM TEMPERATURE TEST MEANS

(75) Inventors: Fabrice Marinet, Chateauneuf Le Rouge (FR); Benjamin Duval, Saint Maximin (FR)

(73) Assignee: STMicroelectronics SA, Montrouge (FR)

( * ) Notice: Subject to any disclaimer, the term of this patent is extended or adjusted under 35 U.S.C. 154(b) by 180 days.

(21) Appl. No.: 10/325,491

(22) Filed: Dec. 19, 2002

(65) Prior Publication Data

US 2003/0118079 A1 Jun. 26, 2003

(30) Foreign Application Priority Data

Dec. 21, 2001 (FR) .............................................. 01 16765

(51) Int. Cl.
*G01K 7/00* (2006.01)
*G01K 7/01* (2006.01)

(52) U.S. Cl. ......................... 374/178; 374/163; 327/512
(58) Field of Classification Search ..................... 374/1, 374/178, 185, 163, 172, 168; 327/512; 257/470
See application file for complete search history.

(56) References Cited

U.S. PATENT DOCUMENTS

| | | | | |
|---|---|---|---|---|
| 3,750,155 A | * | 7/1973 | Oman ................... | 340/870.04 |
| 4,316,175 A | * | 2/1982 | Korber et al. .............. | 246/169 |
| 4,528,637 A | * | 7/1985 | Smith ........................ | 702/133 |
| 5,213,416 A | * | 5/1993 | Neely et al. ................. | 374/178 |
| 5,224,777 A | * | 7/1993 | Hayashi et al. ............. | 374/172 |
| 5,993,060 A | | 11/1999 | Sakurai ....................... | 374/178 |
| 6,043,692 A | * | 3/2000 | Linoff ......................... | 327/117 |
| 6,169,442 B1 | * | 1/2001 | Meehan et al. ............. | 327/513 |
| 6,288,638 B1 | | 9/2001 | Tanguay et al. ............ | 340/514 |
| 6,541,999 B1 | * | 4/2003 | Gergintschw et al. ........ | 326/32 |
| 6,733,174 B1 | * | 5/2004 | Matsumoto et al. ........ | 374/178 |
| 6,778,456 B1 | * | 8/2004 | Kim ........................... | 365/222 |

* cited by examiner

*Primary Examiner*—Diego Gutierrez
*Assistant Examiner*—Mirellys Jagan
(74) *Attorney, Agent, or Firm*—Lisa K. Jorgenson; Allen, Dyer, Doppelt, Milbrath & Gilchrist, P.A.

(57) ABSTRACT

An integrated temperature sensor delivers threshold detection signals when temperature thresholds have been exceeded. The temperature sensor includes a circuit for detecting a first temperature threshold having a first detection threshold, and for detecting a second temperature threshold having a second detection threshold. The circuit also detects a third temperature threshold between the first and second temperature thresholds, and detects a fourth temperature threshold between the first and second temperature thresholds. The third temperature threshold has a third detection threshold linked with the first detection threshold so that a deviation of the first detection threshold causes a corresponding deviation of the third detection threshold. Similarly, the fourth temperature has a fourth detection threshold linked with the second detection threshold so that a deviation of the second detection threshold causes a corresponding deviation of the fourth detection threshold. The third and fourth temperature thresholds define a temperature window to test the temperature sensor for detecting a deviation of the first and second detection thresholds.

33 Claims, 6 Drawing Sheets

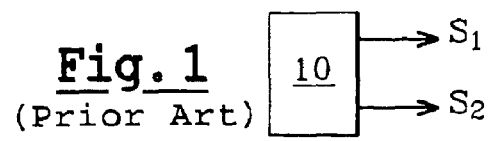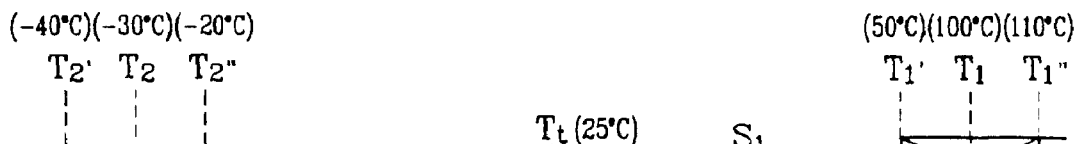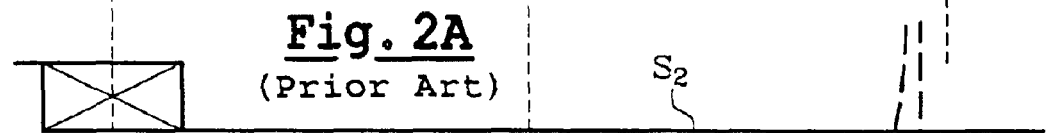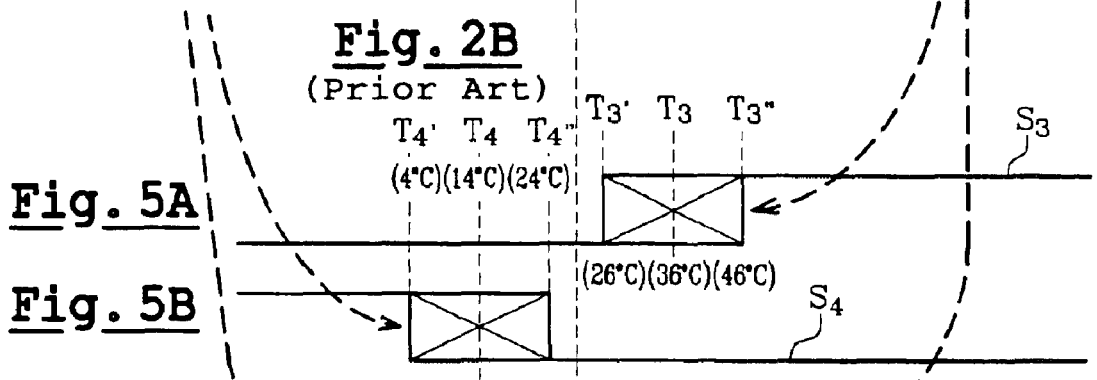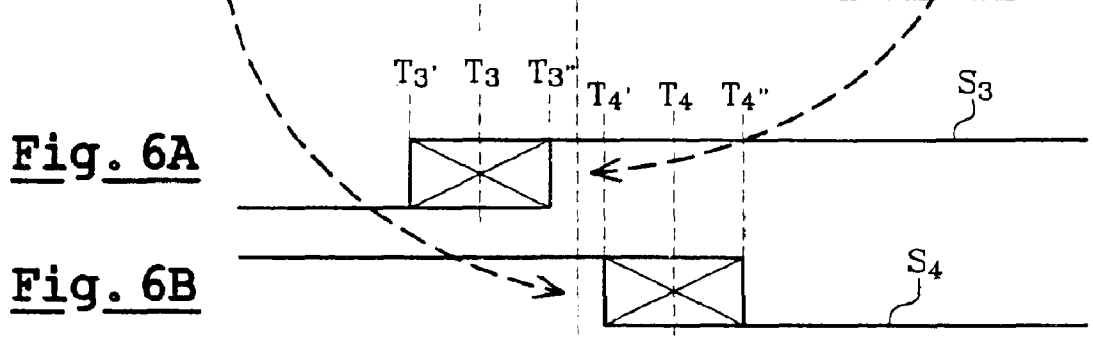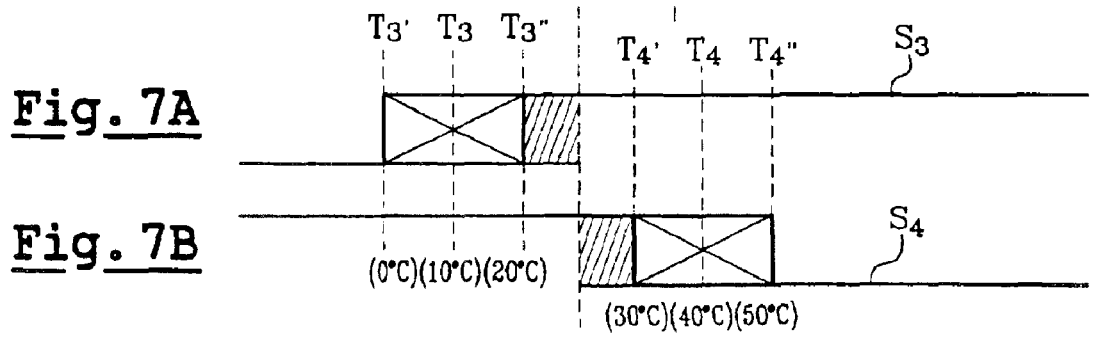

THRESHOLD TEMPERATURE SENSOR COMPRISING ROOM TEMPERATURE TEST MEANS

FIELD OF THE INVENTION

The present invention relates to integrated temperature sensors, and more particularly, to a threshold temperature sensor.

BACKGROUND OF THE INVENTION

Temperature sensors are frequently provided in integrated circuits to detect when the operating temperature limits provided by the manufacturer have been exceeded, for example +100° C. and −30° C. These temperature sensors deliver detection signals that change values when one of these temperatures is exceeded.

To detect these critical temperature thresholds, integrated temperature sensors use the properties of diodes or bipolar transistors to generate currents or voltages proportional to the temperature, as well as reference currents or voltages that do not vary or hardly vary with temperature. A comparison of the voltages or currents varying with temperature, and of the reference voltages or currents enables detection when critical temperature thresholds have been exceeded.

FIG. 1 represents an integrated temperature sensor 10 of the type mentioned above. The temperature sensor 10 delivers two signals $S_1$ and $S_2$ whose value depends on the temperature of the sensor, i.e., the temperature of the silicon wafer on which the sensor is integrated.

FIGS. 2A and 2B represent examples of signals $S_1$ and $S_2$. The signal $S_1$ is, for example, equal to 0 as long as a threshold $T_1$ has not been reached, for example +100° C., and goes to 1 when the threshold $T_1$ is exceeded. The signal $S_2$ is, for example, equal to 0 as long as a threshold $T_2$ has not been reached, for example −30° C., and goes to 1 when the threshold $T_2$ is exceeded. Because of errors in manufacture when integrating the sensor, the detection thresholds of the temperatures $T_1$ and $T_2$ can vary over a wide range of values. The error may be caused by dispersions of the manufacturing method when implanting the electronic components, and by variations in the supply voltage of the sensor.

Tolerance margins $T_{1'}$–$T_{1''}$ and $T_{2'}$–$T_{2''}$ are defined for which the temperature sensor is considered as valid. For a threshold $T_1$ of 100° C., the temperatures $T_{1'}$ and $T_{1''}$ are, for example, equal to 90° C. and 110° C., i.e., a tolerance margin of ±10° C. For a threshold $T_2$ equal to −30° C., the temperatures $T_{2'}$ and $T_{2''}$ are, for example, equal to −40° C. and −20° C.

It is therefore advisable to check the detection thresholds of such a temperature sensor. Such a verification can, for example, take place during electrical testing of the integrated circuit where the sensor is incorporated. This enables one to make sure that the detection thresholds correspond to the temperatures $T_1$ and $T_2$, or at the very least, that they adhere to the tolerance margins $T_{1'}$–$T_{1''}$ and $T_{2'}$–$T_{2''}$.

Still, verification of the detection thresholds requires the silicon wafer to be heated to the temperatures $T_1$ and $T_2$, which are generally far apart from one another. One is very high and the other is very low in order to verify that the signals $S_1$ and $S_2$ change values. Moreover, verification that the detection thresholds adhere effectively to the tolerance margins $T_{1'}$–$T_{1''}$ and $T_{2'}$–$T_{2''}$ requires that that at least four test temperatures $T_{1'}$, $T_{1''}$, $T_{2'}$, $T_{2''}$ are provided. Thus, testing a temperature sensor in an integrated circuit is a rather complex and expensive procedure to implement.

SUMMARY OF THE INVENTION

In view of the foregoing background, an object of the present invention is to enable room temperature testing of the detection thresholds of a temperature sensor of the type mentioned above.

This and other objects, advantages and features in accordance with the present invention are met by an integrated temperature sensor delivering overshoot detection signals of temperature thresholds, and comprising means for detecting a first temperature threshold exhibiting a first detection threshold, and means for detecting a second temperature threshold exhibiting a second detection threshold.

The sensor may further comprise means for detecting a third temperature threshold between the first and second temperature thresholds. The third detection threshold may be linked with the first detection threshold so that a deviation of the first detection threshold causes a corresponding deviation of the third detection threshold. The sensor may also comprise means for detecting a fourth temperature threshold between the first and second temperature thresholds. The fourth detection threshold may be linked with the second detection threshold so that a deviation of the second detection threshold causes a corresponding deviation of the fourth detection threshold. The third and fourth temperature thresholds delineate a temperature window for testing the temperature sensor for detecting a deviation of the first and second detection thresholds.

The first temperature threshold may be greater than the second temperature threshold while the third temperature threshold is less than the fourth temperature threshold. The first detection threshold may be linked with the second detection threshold so that a deviation of the first detection threshold causes a corresponding deviation of the second detection threshold, and vice versa.

According to one embodiment, the sensor comprises means to deliver a first signal varying with temperature according to a first variation law, a second signal varying with temperature according to second variation law, a third signal varying with temperature according to a third variation law, and a fourth signal varying with temperature according to a fourth variation law so that a deviation of the first signal implies a corresponding deviation of the third signal as well as a deviation of the second signal implies a corresponding deviation of the fourth signal.

The sensor may also comprise means to deliver at least one reference signal that does not vary or hardly varies with temperature, and means to compare each of the signals varying with temperature with the reference signal. Detection signals are delivered when the first, second, third and fourth temperature thresholds have been exceeded.

According to one embodiment, the sensor comprises an input to receive a selection signal for a detection threshold. The sensor may also comprise means to select the first or the third signal varying with temperature according to the value of the selection signal, compare the signal selected with the reference signal and deliver an overshoot detection signal of the first or of the third temperature threshold. There is also means to select the second or the fourth signal varying with temperature according to the value of the selection signal, compare the signal selected with the reference signal, and deliver an overshoot detection signal of the second or of the fourth temperature threshold.

According to another embodiment, the sensor comprises an input to receive a selection signal of a detection threshold, means to deliver the first or the third signal varying with temperature according to the value of the selection signal, and means to deliver the second or the fourth signal varying with temperature according to the value of the selection signal. The temperature sensor further comprises means to compare the signal delivered with the reference signal and deliver an overshoot detection signal of the first or of the third temperature threshold, and means to compare the signal delivered with the reference signal and deliver an overshoot detection signal of the second or of the fourth temperature threshold.

According to one embodiment, the sensor comprises means to deliver a first reference signal that does not vary or hardly varies with temperature, a second reference signal that does not vary or hardly varies with temperature, a third reference signal that does not vary or hardly varies with temperature, a fourth reference signal that does not vary or hardly varies with temperature so that a deviation of the first signal implies a corresponding deviation of the third signal and a deviation of the second signal implies a corresponding deviation of the fourth signal. The sensor may also comprise means to deliver at least one signal varying with temperature, and means to compare each of the reference signals with the signal varying with temperature, and deliver overshoot detection signals of the first, second, third and fourth temperature thresholds.

According to another embodiment, the sensor comprises an input to receive a selection signal of a detection threshold, means to select the first or the third reference signal according to the value of the selection signal, compare the signal selected with the signal varying with temperature and deliver an overshoot detection signal of the first or of the third temperature threshold. The sensor may also comprise means to select the second or the fourth reference signal according to the value of the selection signal, compare the signal selected with the signal varying with temperature and deliver an overshoot detection signal of the second or of the fourth temperature threshold.

According to yet another embodiment, the sensor comprises an input to receive a selection signal of a detection threshold, means to deliver the first or the third reference signal according to the value of the selection signal, and means to deliver the second or the fourth reference signal according to the value of the selection signal. The sensor may also comprise means to compare the signal delivered with the signal varying with temperature and deliver an overshoot detection signal of the first or of the third temperature threshold, and means to compare the signal delivered with the signal varying with temperature, and deliver an overshoot detection signal of the second or of the fourth temperature threshold.

Two detection means exhibit detection thresholds linked when they exhibit at least one common electrical element intervening in the detection of the temperature thresholds, such as a current source, an electrical resistor or a transistor. The temperature window may be centered on a temperature on the order of 20 to 30° C. The first temperature threshold may be greater than 50° C., the second temperature threshold may be less than 0° C., and the third and fourth temperature thresholds may be between 0° C. and 50° C.

The present invention also concerns a method to test detection thresholds of an integrated temperature sensor delivering overshoot detection signals of at least two temperature thresholds. The temperature sensor exhibits a first detection threshold of a first temperature threshold, and a second detection threshold of a second threshold temperature. The method preferably comprises offsetting the first detection threshold to obtain a third detection threshold of a third temperature threshold between the first and the second temperature thresholds so that the third detection threshold is linked with the first detection threshold, and a deviation of the first detection threshold causes a corresponding deviation of the third detection threshold. The second detection threshold is preferably offset to obtain a fourth detection threshold of a fourth temperature threshold between the first and second temperature thresholds so that the fourth detection threshold is linked with the second detection threshold, and a deviation of the second detection threshold causes a corresponding deviation of the fourth detection threshold. The threshold detection signals delivered by the temperature sensor are observed while adhering to a temperature window between the third and fourth temperature thresholds.

The temperature sensor is laid out so that the first temperature threshold is greater than the second temperature threshold, and that the third temperature threshold is less than the fourth temperature threshold. The first and the second detection thresholds may be linked so that a deviation of the first detection threshold causes a corresponding deviation of the second detection threshold, and vice-versa.

The temperature sensor may be tested at a single temperature. The temperature window may be centered on a temperature on the order of 20 to 30° C. The first temperature threshold is greater than 50° C., the second threshold temperature is less than 0° C., and the third and fourth temperature thresholds are between 0° C. and 50° C.

According to one embodiment, the step of offsetting the first detection threshold towards the third detection threshold comprises providing, in the temperature sensor, detection means of the first temperature threshold exhibiting a first detection threshold, and detection means of the third temperature threshold exhibiting a third detection threshold linked with the first detection threshold so that a deviation of the first detection threshold causes a corresponding deviation of the third detection threshold. The detection means of the third temperature threshold are used during the test of the temperature sensor. The method may further include offsetting the second detection threshold towards the fourth detection threshold and comprises providing, in the temperature sensor, detection means of the second temperature threshold exhibiting a second detection threshold, and detection means of the fourth temperature threshold exhibiting a fourth detection threshold linked with the second detection threshold so that a deviation of the second detection threshold causes a corresponding deviation of the fourth detection threshold. The detection means of the fourth temperature threshold are used during the test of the temperature sensor.

The detection thresholds of two detection means may be linked while providing in the detection means at least one common electrical element intervening in the detection of the temperature thresholds, such as a current source, an electrical resistor or a transistor.

The temperature sensor preferably contains two multiplexed outputs driven by a threshold selection signal, delivering respectively an overshoot detection signal of the first threshold or of the third threshold, and an overshoot detection signal of the second threshold or of the fourth threshold. The step of offsetting a detection threshold comprises the modification of the value of at least one electrical parameter in the temperature sensor, such as a bias current or an electrical resistor.

BRIEF DESCRIPTION OF THE DRAWINGS

These as well as other objects, characteristics and advantages of the present invention will be disclosed in more detail in the following description of the method of the invention and of diverse embodiments of temperature sensors according to the invention, non-limiting in relation to the appended figures in which:

FIG. 1 represents diagrammatically a threshold temperature sensor according to the prior art;

FIGS. 2A and 2B represent two detection signals delivered by the temperature sensor of FIG. 1;

FIGS. 5A and 5B represent offset detection signals delivered by a threshold temperature sensor and illustrate a first implementation example of the method according to the present invention;

FIGS. 6A and 6B represent offset detection signals delivered by a temperature sensor and illustrate a second implementation example of the method according to the present invention;

FIGS. 7A and 7B represent offset detection signals delivered by a temperature sensor and illustrate a third implementation example of the method according to the present invention;

DETAILED DESCRIPTION OF THE PREFERRED EMBODIMENTS

In the following description, "detection threshold of a temperature X" designates a detection threshold internal to a temperature sensor. This is provided to correspond to the detection of a temperature X. This signal is likely to exhibit a deviation and will no longer correspond to the temperature. For purposes of simplifying the following description, "detection threshold X" designates the detection threshold of the temperature X, and "threshold X" designates the detection threshold of the temperature X or the temperature threshold X, according to the context.

Figure 3:
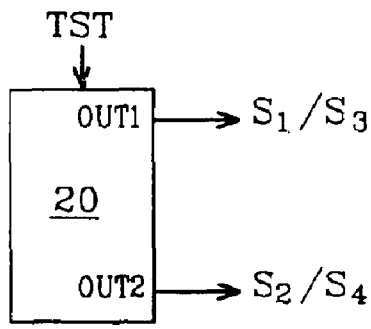
FIG. 3 represents diagrammatically a first type of threshold temperature sensor according to the present invention.

FIG. 3 represents diagrammatically an integrated temperature sensor 20 according to the invention. The temperature sensor exhibits outputs OUT1 and OUT2 which deliver conventionally a normal operating mode of the sensor, that is, two detection signals $S_1$ and $S_2$ as already described above and as represented in FIGS. 2A and 2B. Thus, the signal $S_1$ changes values and goes to 1, for example, when a threshold $T_1$ is exceeded, for example, a threshold equal to +100° C. The signal $S_2$ changes values and goes to 1, for example, when a threshold $T_2$ is exceeded, for example, a threshold equal to −30° C.

According to the invention, the temperature sensor 20 exhibits an input receiving a signal TST (TEST) for switching the temperature sensor to a special operating or test mode wherein the outputs OUT1, OUT2 no longer deliver the signals $S_1$ and $S_2$, but deliver signals $S_3$ and $S_4$ for respectively detecting offset temperature thresholds $T_3$ and $T_4$, which are close to one another and close to a test temperature $T_t$. The test temperature $T_t$ is preferably the temperature of a test room, i.e., generally 25° C., assuming the integrated circuits to be tested are situated at this temperature.

According to one essential aspect of the invention, the detection threshold of the temperature $T_3$ is linked with the detection threshold of the temperature $T_1$, and the detection threshold of the temperature $T_4$ is linked with the detection threshold of the temperature $T_2$. This is so that a deviation of the detection threshold of the temperature $T_1$ is expressed by a corresponding deviation of the detection threshold of the temperature $T_3$, and a deviation of the detection threshold of the temperature $T_2$ is expressed by a corresponding deviation of the detection threshold of the temperature $T_4$.

Preferably, the detection thresholds of the temperatures $T_1$ and $T_2$ are also linked so that a deviation in the detection of any of the temperatures $T_1$ or $T_2$ implies a corresponding deviation in the detection of the other temperatures $T_2$ or $T_1$, $T_3$ and $T_4$.

It can be derived from the following that four linked detection thresholds enables testing of the detection thresholds of the temperatures $T_1$ and $T_2$ with a single test temperature. It will also appear in the following that detection thresholds which are linked in terms of deviation can be easily obtained by a temperature measuring means with common elements, notably current sources and/or voltage sources, resistors, transistors, etc.

FIGS. 5A and 5B, 6A and 6B, 7A and 7B illustrate three non-limiting implementation examples of the method according to the invention. The temperature thresholds $T_1$ and $T_2$ are respectively equal to +100° C. and −30° C., and the sensor is to be tested at a temperature $T_t$ on the order of 25° C.

In FIGS. 5A and 5B, the signal S3 exhibits a detection threshold $T_3$ equal to 36° C. corresponding to the offset of the threshold $T_1$ towards the test temperature $T_t$. The threshold $T_3$ is selected so that a temperature range $T_3'$–$T_3''$ corresponding to a set tolerance margin, such as the range 26° C.–46° C. corresponding to a tolerance of ±10°, for example, is situated on the right-hand edge of the temperature $T_t$. Besides, the signal $S_4$ exhibits a detection threshold $T_4$ equal to 14° C. corresponding to an offset of the threshold $T_2$ towards the temperature $T_t$ selected so that a temperature range $T_4'$–$T_4''$ corresponding to a set tolerance margin, for example 4° C.–24° C., is situated on the left-hand edge of the test temperature.

The advantages of the method according to the invention in this example are as follows. First, if the thresholds $T_1$ and $T_3$, respectively $T_2$ and $T_4$, are linked, but the thresholds $T_1$ and $T_2$ are not, a test sequence conducted at temperature $T_t$ that includes observing the signals $S_3$ and $S_4$ (which must be equal to 0), enables detection of a left-hand offset of the threshold $T_3$ outside the tolerance margin (signal $S_3$ at 1) or a right-hand offset of the threshold $T_4$ outside the tolerance margin (signal $S_4$ at 1). If the thresholds $T_1$ and $T_3$, respectively $T_2$ and $T_4$, are linked, it can be determined that the threshold(s) $T_1$, $T_2$ of the sensor are not situated within the tolerance margin. Conversely, detecting a right-hand offset of the threshold $T_3$ or a left-hand offset of the threshold $T_4$ outside the tolerance margin calls for two other test temperatures, respectively $T_{4'}$ (+4° C.) and $T_{3''}$ (+46° C.), to delineate the test zone.

If, conversely, the thresholds $T_1$ and $T_2$ are linked, a single test sequence conducted at temperature $T_t$ that includes observing the signals $S_3$ and $S_4$ (which must be equal to 0), enables one to simultaneously detect a left-hand or right-hand offset of the threshold $T_3$ outside the tolerance margin (signal $S_3$ at 1) or a right-hand offset of the threshold $T_4$ outside the tolerance margin (signal $S_4$ at 1). The test sequence at temperature $T_t$ enables one to verify simultaneously that the thresholds $T_1$ and $T_2$ are situated within the tolerance margins $T_1$–$T_{1''}$ and $T_2$–$T_{2''}$. This can be understood easily in reference to FIGS. 2A, 2B, 5A and 5B while considering that the four tolerance margins $T_1$–$T_{1''}$, $T_2$–$T_{2''}$, $T_{3'}$–$T_{3''}$, $T_{4'}$–$T_{4''}$ offset together to the right or to the left (the detection thresholds $T_1$, $T_2$, $T_3$ and $T_4$ are linked). A collective offset, however small, will cause the value of one of the test signals $S_3$ or $S_4$ to change with respect to the expected value (here 0).

In FIGS. 6A and 6B, the detection thresholds offset $T_3$ and $T_4$ are interlaced. The signal $S_3$ exhibits a threshold $T_3$ equal to 14° C., corresponding to the offset of the left-hand threshold $T_1$ of the test temperature $T_t$. The signal $S_4$ exhibits a detection threshold $T_4$ equal to 36° C., corresponding to the offset of the right-hand threshold $T_2$ of the temperature $T_t$. The threshold $T_3$ is selected so that a temperature range $T_{3'}$–$T_{3''}$ corresponding to a set tolerance margin, such as the range 4° C.–24° C. corresponding to a tolerance of ±10°, for example, is situated on the left-hand edge of the temperature $T_t$. The threshold $T_4$ is selected so that the temperature range $T_{4'}$–$T_{4''}$ corresponding to the set tolerance margin, such as the range 26° C.–46° C., for example, is situated on the right-hand edge of the temperature $T_t$.

This implementation example offers the same advantages as described above. Another advantage due to the fact that the detection thresholds are interlaced is that the signals $S_3$ and $S_4$ are equal to 1 when the sensor is at the test temperature $T_t$, which enables one to verify that the means for switching the signals of the sensor operate correctly. Thus, if the detection thresholds $T_1$ and $T_3$, respectively $T_2$ and $T_4$ are linked, but the detection thresholds $T_1$ and $T_2$ are not, a single test sequence conducted at temperature $T_t$, which includes observing the values of the signals $S_3$ and $S_4$ (which must now be equal to 1), enables one to detect a right-hand offset of the threshold $T_3$ outside the tolerance margin (signal $S_3$ at 0) or a left-hand offset of the threshold $T_4$ outside the tolerance margin (signal $S_4$ to 0).

Conversely, the detection of a left-hand offset of the threshold $T_3$ and a right-hand offset of the threshold $T_4$ outside the tolerance margin calls for two other test temperatures to be provided, respectively $T_{3'}$ (+4° C.) and $T_{4''}$ (+46° C.). If conversely, the thresholds $T_1$ and $T_2$ are linked, a single test sequence conducted at temperature $T_t$ enables detection of a left-hand or right-hand offset of the threshold $T_3$ outside the tolerance margin (signal $S_3$ at 0) or a right-hand offset of the threshold $T_4$ outside the tolerance margin (signal $S_4$ at 0) This enables one to verify in a single phase that the thresholds $T_1$ and $T_2$ lie within the tolerance margins $T_1$–$T_{1''}$ and $T_2$–$T_{2''}$.

In FIGS. 7A and 7B, the detection thresholds $T_3$ and $T_4$ are still interlaced but respectively exhibit an additional deviation to the left (towards negative temperatures) and to the right (towards positive temperatures). For example, $T_3$ is equal to 10° C. and $T_4$ equal to 40° C., the tolerance margin $T_{3'}$–$T_{3''}$ is equal to 0° C.–10° C. and the tolerance margin $T_{4'}$–$T_{4''}$ equal to 30° C.–50° C. Here is an additional degree of freedom with regards to the selection of the test temperature $T_t$, which can lie between the temperatures $T_{3''}$ and $T_{4'}$, i.e., between 20° C. and 30° C. The sensor can in such a case be tested with less control of the temperature of the test room, at a test temperature between 20° C. and 30° C. enabling one to verify simultaneously that the thresholds $T_1$ and $T_2$ lie within the tolerance margins $T_1$–$T_{1''}$ and $T_2$–$T_{2''}$ (while neglecting the tolerance margin $T_{3''}$–$T_{4'}$).

Diverse embodiment examples of temperature sensors according to the invention will now be described. It should be noted first that, although it is sufficient to implement the method of the invention, a temperature sensor may deliver the signals $S_3$ and $S_4$ instead of the signals $S_1$ and $S_2$ during the test phase. A sensor according to the invention can also exhibit two additional outputs to deliver the signals $S_3$ and $S_4$. Thus, the temperature sensor 30 represented in FIG. 4 exhibits two outputs OUT1 and OUT2 delivering the signals $S_1$ and $S_2$, and two outputs OUT3 and OUT4 delivering signals $S_3$ and $S_4$ having detection thresholds linked with those of the signals $S_1$ and $S_2$. The outputs OUT3, OUT4 and the signals $S_3$, $S_4$ are used during the test phases of the sensor, instead of the outputs OUT1, OUT2 and signals $S_1$, $S_2$. Such a "use" of the signals $S_3$, $S_4$ instead of the signals $S_1$, $S_2$ is equivalent, in terms of the method, to a transformation of the signal $S_1$ into a signal $S_3$ and to a transformation of the signal $S_2$ into a signal $S_4$. Both embodiments correspond to an offset of the detection thresholds $T_1$ and $T_2$ to form the close detection thresholds $T_3$ and $T_4$.

Figure 8:
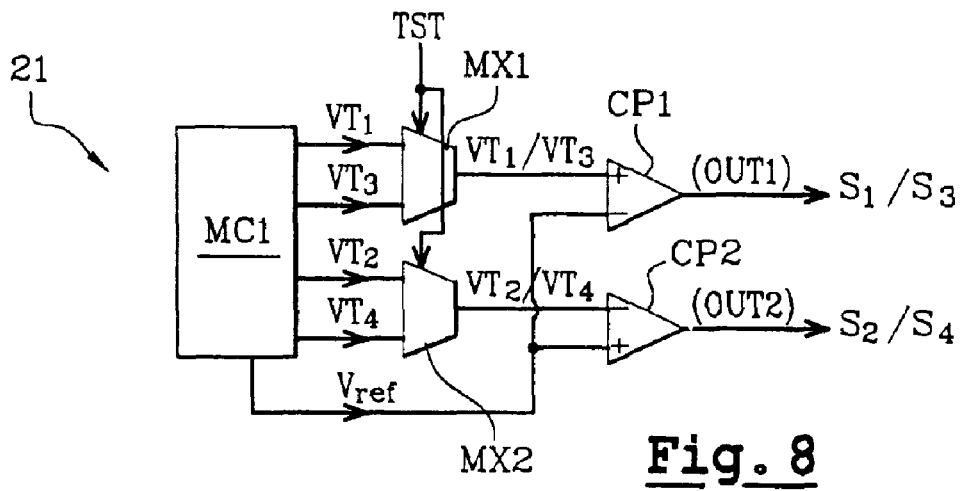
FIG. 8 represents a first embodiment of a temperature sensor of the type represented in FIG. 3.

FIG. 8 represents one embodiment example of a temperature sensor 21 of the type represented in FIG. 3, exhibiting two outputs OUT1, OUT2 delivering the signals $S_1$, $S_2$ or $S_3$, $S_4$ according to the value of the signal TST. The sensor 21 comprises a measuring circuit MC1 delivering four voltages $VT_1$, $VT_2$, $VT_3$, $VT_4$ varying in proportion to the temperature according to different coefficients of proportionality, as well as a reference voltage $V_{ref}$ independent of the temperature. The voltages $VT_1$ and $VT_3$ are applied to the inputs of an analog multiplexer MX1 driven by the signal TST, and the voltages $VT_2$ and $VT_4$ are applied to the inputs of an analog multiplexer MX2 also driven by the signal TST. The output of the multiplexer MX1 delivers the voltage $VT_1$ or the voltage $VT_3$ according to the value of the signal TST, and is applied to the positive input of a comparator CP1 whose negative input receives the voltage $V_{ref}$ and whose output forms the output OUT1 of the sensor. The output of the multiplexer MX2 delivers the voltage $VT_2$ or the voltage $VT_4$ according to the value of the signal TST, and is applied to the negative input of a comparator CP2 whose positive input receives the voltage $V_{ref}$ and whose output forms the output OUT2 of the sensor.

Figure 4:
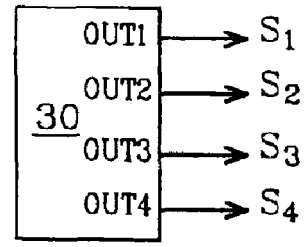
FIG. 4 represents diagrammatically a second type of temperature sensor according to the present invention.
Figure 9:
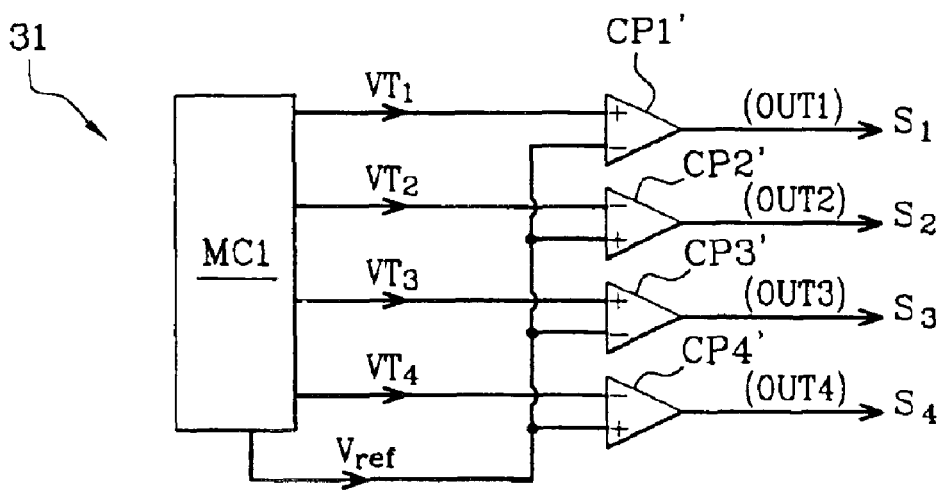
FIG. 9 represents a first embodiment of a temperature sensor of the type represented in FIG. 4.

FIG. 9 represents one embodiment example of a temperature sensor 31 of the type represented in FIG. 4, exhibiting four outputs OUT1, OUT2, OUT3, $OUT_4$ delivering respectively the signals $S_1$, $S_2$, $S_3$, $S_4$. The sensor 21 comprises the measuring circuit MC1 mentioned above and four comparators CP1', CP2', CP3', CP4'. The comparator CP1' receives on its positive input the voltage $VT_1$, on its negative input the voltage $V_{ref}$, and delivers the signal $S_1$. The comparator CP2' receives on its negative input the voltage $VT_2$, on its positive input the voltage $V_{ref}$, and delivers the signal $S_2$. The comparator CP3' receives on its positive input the voltage $VT_3$, on its negative input the voltage $V_{ref}$, and delivers the signal $S_3$. The comparator CP4' receives on its negative input the voltage $VT_4$, on its positive input the voltage $V_{ref}$, and delivers the signal $S_4$.

Figure 10:
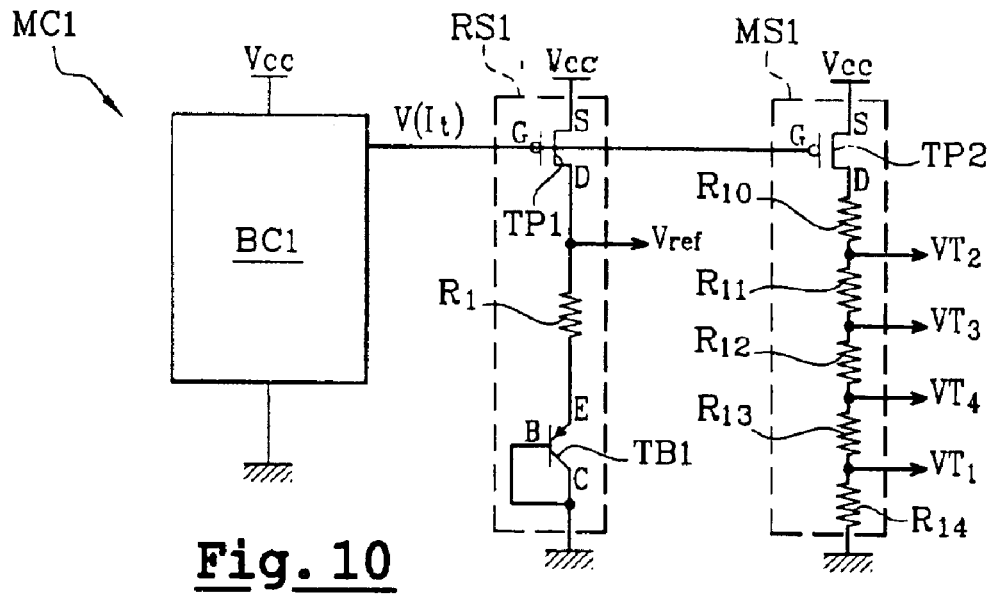
FIG. 10 represents a measuring circuit available in a temperature sensor according to one of FIG. 8 or 9.

FIG. 10 represents one embodiment example of the measuring circuit MC1. The latter comprises a bias circuit BC1, a reference stage RS1 delivering the voltage $V_{ref}$, and a measuring stage MS1 delivering the voltages $VT_1$, $VT_2$, $VT_3$ and $VT_4$. The circuit BC1 is powered by a voltage Vcc, and delivers a voltage $V(I_t)$ that should be applied to the gate of a transistor PMOS in order to form a source of current imposing a current $I_t$ proportional to the temperature T, of the type $I_t = \alpha T$, with $\alpha$ being a constant.

The reference stage RS1 comprises a transistor PMOS TP1 receiving the voltage Vcc on its source S and the voltage $V(I_t)$ on its gate G. The drain D of this transistor is connected to the end of a resistor $R_1$ whose other end is connected to the emitter E of a bipolar transistor TB1 of the type PNP having its base and its collector connected to ground (diode). The voltage $V_{ref}$ is drawn from the connection node of the drain D of the transistor TP1 and of the resistor $R_1$. The stage RS1 conducts through it the current $I_t$, and the resistor $R_1$ exhibits a value selected so that the voltage $V_{ref}$ is independent of the temperature, wherein:

$$V_{ref} = R_1 * I_t + V_{be}(T) = R_1 * \alpha T + V_{be}(T) = \text{Constant}$$

$V_{be}(T)$ is the emitter-base voltage of the transistor TB1, whose variations in relation to the temperature are compensated for by the variations of the term $R_1 * \alpha T$.

The stage MS1 comprises a transistor PMOS TP2 receiving on its source S the voltage Vcc and on its gate G the voltage $V(I_t)$. The transistors TP2 and TP1 are thus laid out symmetrically for conducting current. The drain D of the transistor TP2 is connected to ground by five series resistors $R_{10}$, $R_{11}$, $R_{12}$, $R_{13}$, $R_{14}$. The cathode of the resistor $R_{14}$ is connected to ground. The voltage $VT_1$ is drawn from the anode of the resistor $R_{14}$, the voltage $VT_2$ is drawn from the anode of the resistor $R_{11}$, the voltage $VT_3$ is drawn from the anode of the resistor $R_{12}$, and the voltage $VT_4$ is drawn from the anode of the resistor $R_{13}$.

The detection thresholds of the temperatures $T_1$ to $T_4$ are linked, as readily understood by those skilled in art. A deviation of an operating point of the measuring circuit MC1 causes a corresponding deviation of the voltages $VT_1$, $VT_2$, $VT_3$ and $VT_4$ and consequently a deviation of detection thresholds. A deviation of the voltage $V_{ref}$ has an identical effect on the detection thresholds by acting on the triggering thresholds of the comparators. A deviation of the operating point can be due to a variation of the voltage Vcc, a variation of the voltage $V(I_t)$, a dispersion of the ratio W/L (gate width over length) of a transistor TP1 or TP2, a dispersion of the resistivity by square SQR of the material forming the resistors $R_1$, $R_{10}$ to $R_{14}$.

It should be noted that a deviation of a detection threshold $T_1$, $T_2$ causes a corresponding deviation of the offset detection threshold $T_3$, $T_4$ when the deviation is expressed as a percentage. Thus, for example, the detection threshold of the temperature $T_1$ that will be designated as $ST_1$ is defined by the following relation:

$$V_{ref} = VT_1$$

$$V_{ref} = R_{14} * I$$

$$V_{ref} = R_{14} * \alpha * ST_1$$

$$ST_1 = V_{ref}/R_{14} * \alpha$$

Similarly, the detection threshold of the temperature $T_3$ that will be designated as $ST_3$ is defined by the following relation:

$$V_{ref} = VT_3$$

$$V_{ref} = (R_{12} + R_{13} + R_{14}) * I$$

$$V_{ref} = (R_{12} + R_{13} + R_{14}) * \alpha * ST_3$$

$$ST_3 = V_{ref}/(R_{12} + R_{13} + R_{14}) * \alpha$$

The ratio between both thresholds is therefore:

$$ST_1/ST_3 = V_{ref}/V_{ref} * (R_{12} + R_{13} + R_{14})/R_{14} * \alpha/\alpha$$

If one of the parameters $V_{ref}$, $\alpha$, SQR varies and causes a deviation of the thresholds $ST_1$ and $ST_3$, the ratio between the thresholds remains the same. For example, a 5% deviation of $ST_1$ causes a 5% deviation of $ST_3$.

It has been suggested in the foregoing, for simplification purposes, to provide for the offset thresholds $T_3$ and $T_4$ tolerance margins which are of the same value as the tolerance margins of the useful thresholds $T_1$ and $T_2$. In order to take into account the observation above, it is possible to provide a contraction of the tolerance margins defined for the thresholds $T_1$ and $T_2$ when the tolerance margins of the thresholds $T_3$ and $T_4$ are determined. On the other hand, the term "corresponding" in the expression "corresponding deviation" which is used in this description and in the claims, must be construed in the light of the observation above.

Figure 11:
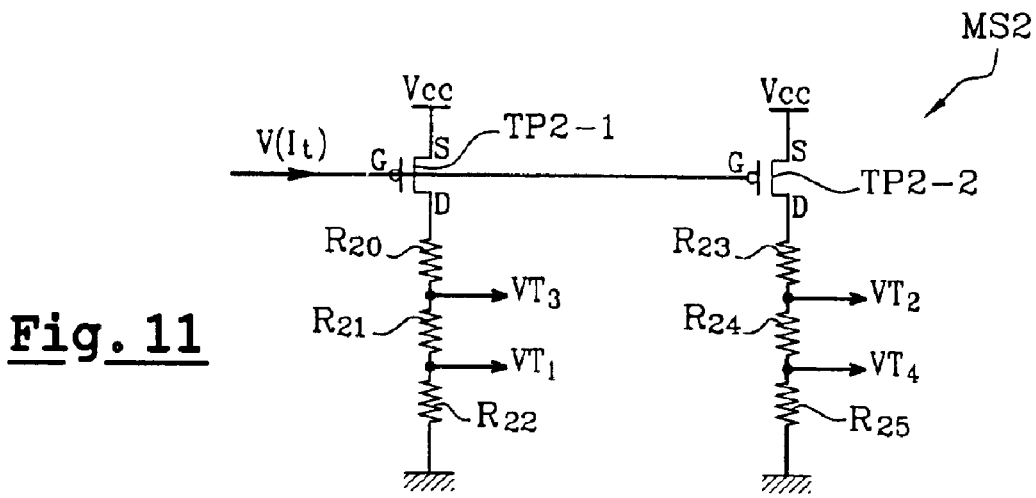
FIG. 11 represents one embodiment variation of a measuring stage available in the measuring circuit of FIG. 10.

FIG. 11 represents a variation MS2 of the measuring stage. The stage MS2 comprises two transistors PMOS TP2-1, TP2-2 receiving the voltage Vcc on their sources S and the voltage $V(I_t)$ on their gates G. The drain D of the transistor TP2-1 is connected to the ground by three series resistors $R_{20}$, $R_{21}$, $R_{22}$. The cathode of the resistor $R_{22}$ is connected to ground. The voltage $VT_1$ is drawn from the anode of the resistor $R_{22}$ and the voltage $VT_3$ is drawn from the anode of the resistor $R_{21}$. The drain D of the transistor TP2-2 is connected to ground by three series resistors $R_{23}$, $R_{24}$, $R_{25}$. The cathode of the resistor $R_{25}$ is connected to ground. The voltage $VT_2$ is drawn from the anode of the resistor $R_{24}$ and the voltage $VT_4$ is drawn from the anode of the resistor $R_{25}$.

The detection thresholds of the temperatures $T_1$ to $T_4$ are also linked in this embodiment in case of a variation of the parameters $V_{ref}$, $\alpha$ and SQR, unless there is an isolated error regarding the value of one of the resistors. There is little probability of the later happening. However, in such a case, the voltages $VT_1$ and $VT_3$ remain linked, and consequently the detection thresholds of the temperatures $T_1$ and $T_3$. The voltages $VT_2$ and $VT_4$ also remain linked, and consequently the temperature thresholds $T_2$ and $T_4$.

Figure 12:
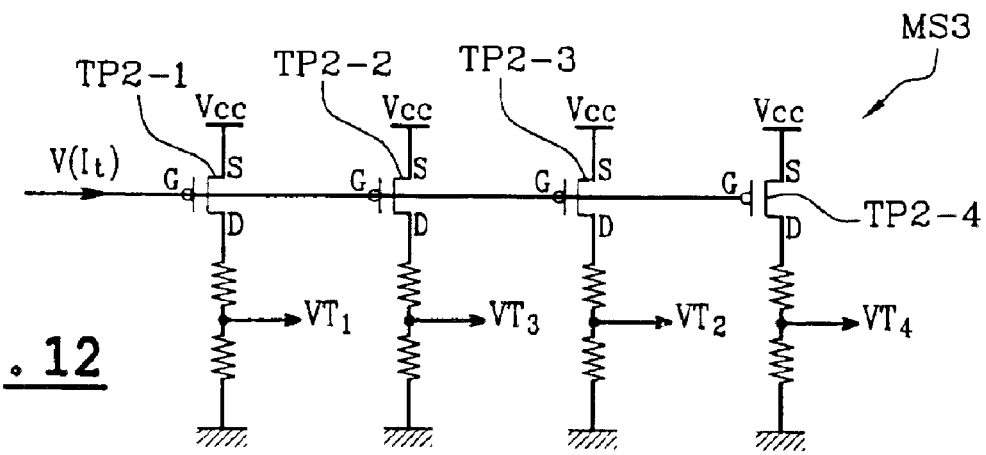
FIG. 12 represents another embodiment variation of a measuring stage available in the measuring circuit of FIG. 10.

FIG. 12 represents another variation MS3 of the measuring stage. The stage MS3 comprises four transistors PMOS TP2-1, TP2-2, TP2-3, TP2-4 each receiving the voltage Vcc on their sources S and the voltage $V(I_t)$ on their gates G. The drain D of the transistor TP2-1 is connected to ground by two series resistors, and the voltage $VT_1$ is drawn from the middle point of both resistors. Similarly, the drain of the transistor TP2-2 is connected to ground by two series resistors, and the voltage $VT_2$ is drawn from the middle point of both resistors. The drain of the transistor TP2-3 is connected to ground by two series resistors, and the voltage $VT_3$ is drawn from the middle point of both resistors. The drain of the transistor TP2-4 is connected to ground by two series resistors, and the voltage $VT_4$ is drawn from the middle point of both resistors.

The detection thresholds of the temperatures $T_1$ to $T_4$ are also linked in this embodiment, unless there is an isolated error regarding the value of one of the resistors. There is little probability of the later happening. The errors in resistivity due to a dispersion of the manufacturing method generally concern a whole set of resistors.

Figure 13:
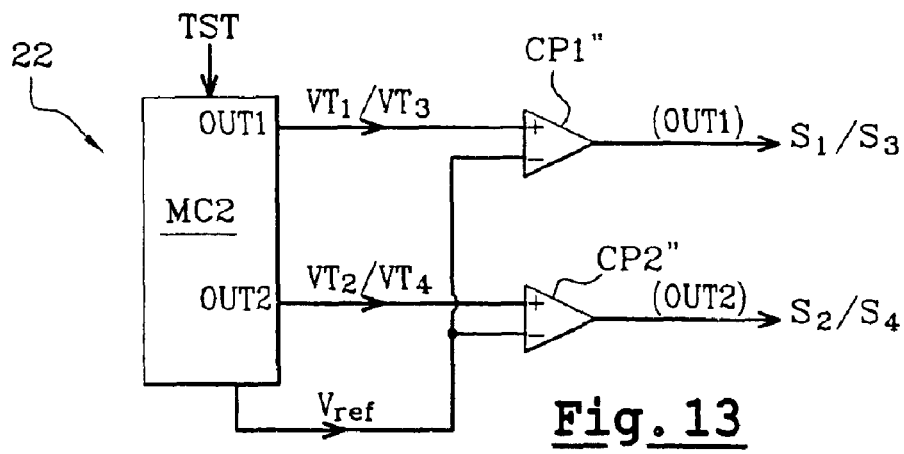
FIG. 13 represents a second embodiment of a temperature sensor of the type represented in FIG. 3.

FIG. 13 represents one embodiment example of a temperature sensor 22 of the type represented in FIG. 3, exhibiting two outputs OUT1, OUT2 delivering the signals $S_1$, $S_2$ or $S_3$, $S_4$ according to the value of the signal TST. The sensor 22 comprises a measuring circuit MC2 receiving at input the signal TST, delivering on an output OUT1 the voltage $VT_1$ or the voltage $VT_3$ according to the value of the signal TST, delivering on an output OUT2 the voltage $VT_2$ or the voltage $VT_4$ according to the value of the signal TST, and delivering also the reference voltage $V_{ref}$ independent of the temperature. The voltage $VT_1/VT_3$ delivered by the output OUT1 is applied to the positive input of a comparator CP1" whose negative input receives the voltage $V_{ref}$. The output of the comparator CP1" forms the output OUT1. The voltage $VT_2/VT_4$ delivered by the output OUT2 is applied to the negative input of a comparator CP2" whose positive input receives the voltage $V_{ref}$. The output of the comparator CP2" forms the output OUT2.

Figure 14:
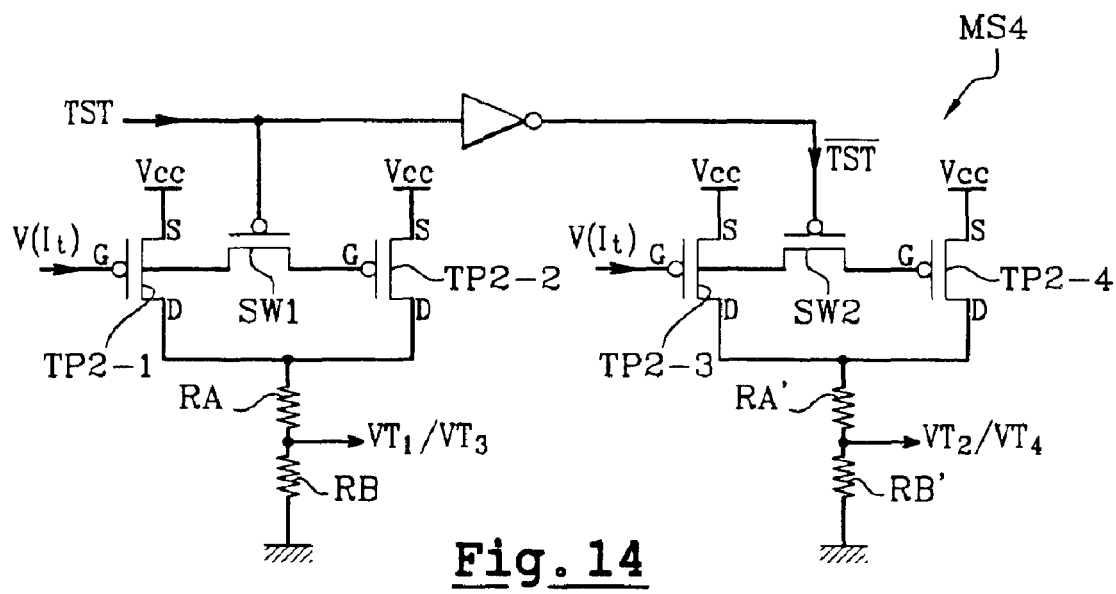
FIG. 14 represents one embodiment of a measuring stage available in the temperature sensor of FIG. 13.

FIG. 14 represents one embodiment example of a measuring stage MS4 that may be used in the circuit MC2 to generate the voltages $VT_1/VT_3$ and $VT_2/VT_4$. As previously, the measuring stage MS4 is biased by a voltage $V(I_t)$ delivered by a bias circuit (not represented). The measuring stage MS4 comprises a first group of two parallel transistors PMOS TP2-1, TP2-2, receiving the voltage Vcc on their sources. Their drains are interconnected and connected to ground by two series resistors RA, RB. The measuring stage MS4 comprises a second group of two parallel transistors PMOS TP2-3, TP2-4, receiving the voltage Vcc on their sources. Their drains are interconnected and connected to ground by two series resistors RA', RB'. The transistors TP2-1 and TP-3 receive on their gates the signal $V(I_t)$. The gate of the transistor TP2-2 receives the signal $V(I_t)$ via a switch transistor SW1, and the gate of the transistor TP2-4 receives the signal $V(I_t)$ via a switch transistor SW2. The switch SW1 is driven by the signal TST, and the switch SW2 is driven by an inverse signal/TST delivered by a inverting gate INV1.

According to the value of the signal TST, the switch SW1 is open (transistor SW1 blocked) and the switch SW2 closed (transistor SW2 conductive), or conversely. When SW1 is open and SW2 closed, a current equal to It runs through the resistors RA, RB and a current equal to $2I_t$ runs through the resistors RA', RB'. The middle point of resistors RA, RB delivers the voltage $VT_1$ and the middle point of the resistors RA', RB' delivers the voltage $VT_2$. When SW1 is closed and SW2 open, a current equal to $2I_t$ runs through the resistors RA, RB and a current equal to $I_t$ runs through the resistors RA', RB'. The middle point of the resistors RA, RB delivers the voltage $VT_3$ and the middle point of the resistors RA', RB' delivers the voltage $VT_4$.

Figure 15:
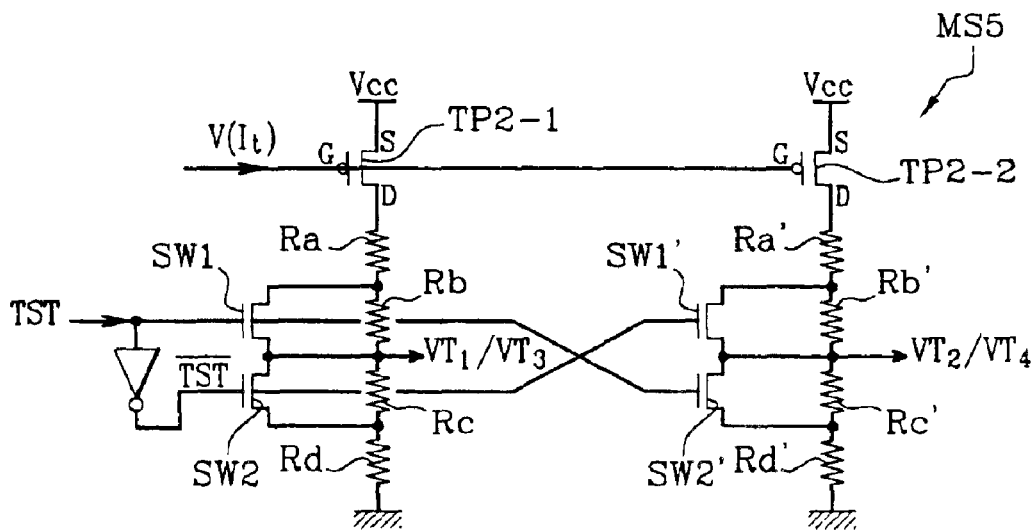
FIG. 15 represents another embodiment of a measuring stage available in the temperature sensor of FIG. 13.

FIG. 15 represents another embodiment example of a measuring stage MS5 that may be used in the measuring circuit MC2. The generation of the voltages $VT_1/VT_3$ and $VT_2/VT_4$ are based on resistance-changing instead of current-changing. The measuring stage MS5 comprises two transistors PMOS TP2-1, TP2-2 receiving the voltage Vcc on their sources and the voltage $V(I_t)$ on their gates G. The drain of the transistor TP2-1 is connected to ground by four series resistors $R_a$, $R_b$, $R_c$, $R_d$. The cathode of the resistor $R_d$ is connected to ground. The drain of the transistor TP2-2 is connected to ground by four series resistors $R_{a'}$, $R_{b'}$, $R_{c'}$, $R_{d'}$. The cathode of the resistor $R_{d'}$ is connected to ground. A switch transistor SW1 driven by the signal TST is parallel with the resistor $R_b$. A switch transistor SW2 driven by the signal/TST is parallel with the resistor $R_c$. A switch transistor SW1' driven by the signal/TST is parallel with the resistor $R_{b'}$, and a switch transistor SW2' driven by the signal TST is parallel with the resistor $R_{c'}$.

When the switches SW1, SW2' are closed and the switches SW2, SW1' open, the resistors $R_b$, $R_{c'}$ are short-circuited. The anode of the resistor $R_c$ delivers the voltage $VT_1$ and the anode of the resistor $R_{c'}$ delivers the voltage $VT_2$. When the switches SW1, SW2' are open and the switches SW2, SW1' closed, the resistors $R_a$, $R_{b'}$ are short-circuited. The anode of the resistor $R_c$ delivers the voltage $VT_3$ and the anode of the resistor $R_{c'}$ delivers the voltage $VT_4$.

Figure 16:
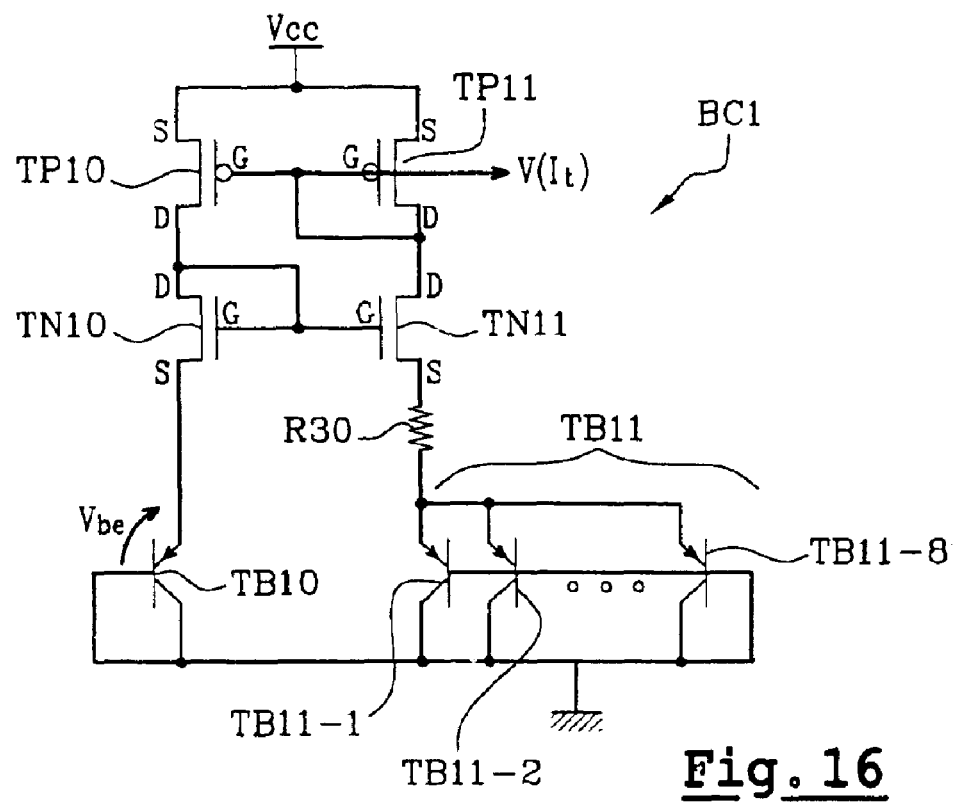
FIG. 16 represents one embodiment example of a bias circuit available in a temperature sensor according to the present invention.

FIG. 16 represents one embodiment example of the bias circuit BC1 delivering the voltage $V(I_t)$. The circuit BC1 comprises two transistors PMOS TP10 and TP11 in parallel, receiving the voltage Vcc on their sources. The gates of transistors TP10, TP11 and the drain of the transistor TP11 are interconnected. The drain of the transistor TP10 is connected to the drain of a transistor NMOS TN10 whose source is connected to the emitter of a bipolar transistor TB10 having its base and its collector connected to ground. The drain of the transistor TP11 is connected to the drain of a transistor NMOS TN11 whose source is connected to the end of a resistor R30. The gates of the transistors TN10, TN11 and the drain of the transistor TN10 are interconnected. The other end of the resistor R30 is connected to the emitter of a bipolar transistor TB11 having its base and its collector connected to ground. The transistor TB11 is formed by 8 identical transistors TB11-1, TB11-2, . . . TB11-8. The voltage $V(I_t)$ is drawn from the gates of the transistors TP10, TP11.

In such a circuit, the transistors TP10 and TP11 are laid out symmetrically for conducting current and conduct the same current $I_t$. The gate-source voltages of cascade transistors TN10, TN11 are identical, the base-emitter voltages $V_{be}$ of the transistors TB10 and TB11 are identical, and the currents running through the transistors TB11-$i$ forming the transistor TB11 are 8 times smaller than the current $I_t$. It can be derived that:

$$I_t = \alpha T$$

with:

$$\alpha = k/q * \ln(8)/r$$

k is Boltzmann's constant, q is the load of the electron, ln is a logarithmic function, and r is the value of the resistor R30.

As described above, the gate voltage $V(I_t)$ enables one to impose the current $I_t$ in other parts of the sensor to generate the reference voltage $V_{ref}$ (a band gap voltage) and the voltages $VT_1$, $VT_2$, $VT_3$, $VT_4$ proportional to the temperature.

Such a temperature sensor according to the invention is susceptible to diverse other embodiments, as readily appreciated by those skilled in the art. Notably, although a detection of the temperature thresholds $T_1$, $T_2$, $T_3$, $T_4$ by voltages $VT_1$, $VT_2$, $VT_3$, $VT_4$ proportional to the temperature and a reference voltage $V_{ref}$ has been described in the foregoing, a temperature sensor according to the invention can also use several reference voltages and one or several voltages proportional to the temperature.

Figure 17:
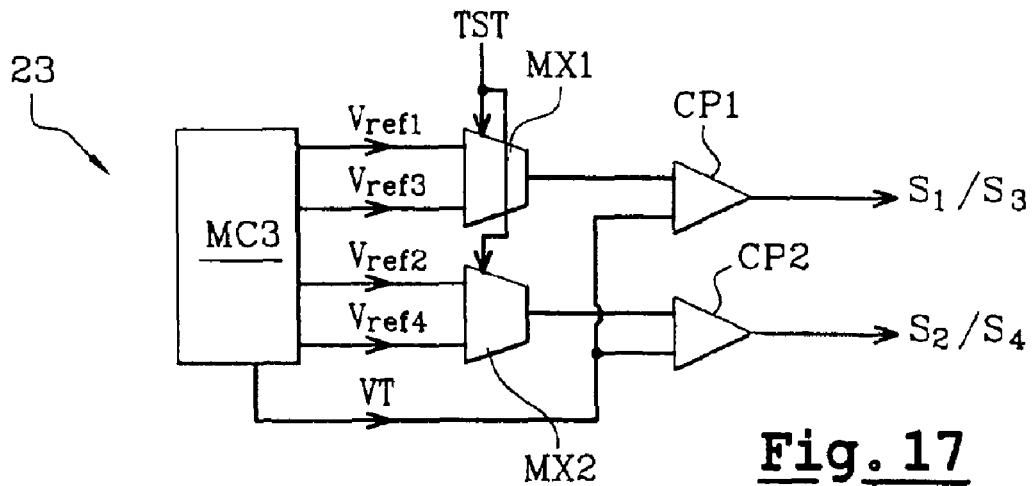
FIG. 17 represents a third embodiment of a temperature sensor of the type represented in FIG. 3.

Thus, FIG. 17 represents a sensor 23 which exhibits the same structure as the sensor 21 described above in relation to FIG. 8, but wherein the measuring circuit MC1 is replaced with a measuring circuit MC3 which delivers four reference voltages $V_{ref1}$, $V_{ref2}$, $V_{ref3}$, $V_{ref4}$ and a voltage VT proportional to the temperature. The voltages $V_{ref1}$ and $V_{ref3}$ are linked in terms of deviation, the voltages $V_{ref2}$ and $V_{ref4}$ are linked, and the voltages $V_{ref1}$ and $V_{ref2}$ are preferably linked. The voltages $V_{ref1}$, $V_{ref3}$ are applied to the inputs of the multiplexer MX1 and the voltages $V_{ref2}$, $V_{ref4}$ are applied to the inputs of the multiplexer MX2. According to the value of the signal TST, the comparator CP1 compares the voltage $V_{ref1}$ or the voltage $V_{ref3}$ with the voltage VT, and delivers the signal $S_1$ or the signal $S_3$. Similarly, the comparator CP2 compares the voltage $V_{ref2}$ or the voltage $V_{ref4}$ with the voltage VT, and delivers the signal $S_2$ or the signal $S_4$.

Figure 18:
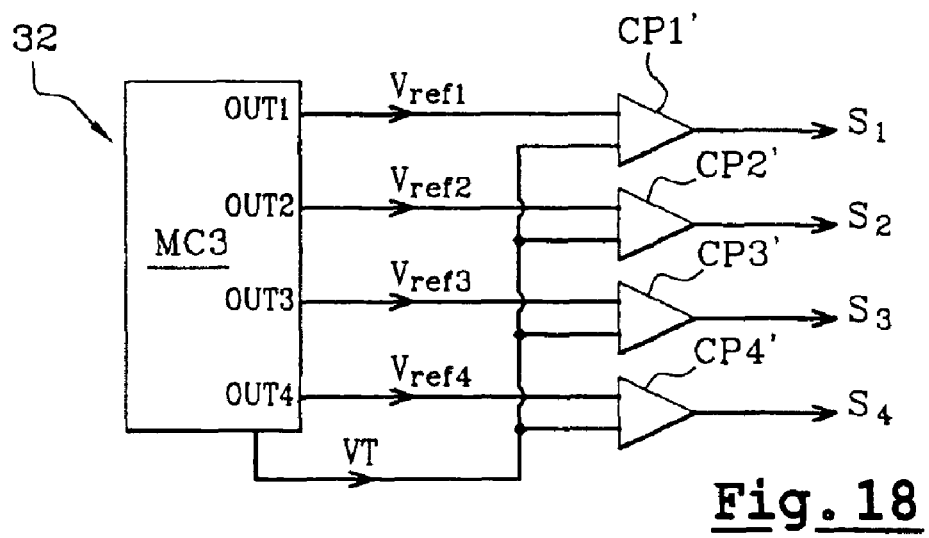
FIG. 18 represents a second embodiment of a temperature sensor of the type represented in FIG. 4.

In the same perspective, FIG. 18 represents a sensor 32 which exhibits the same structure as the sensor 31 described above in relation to FIG. 9, but wherein the measuring circuit MC1 is replaced with the measuring circuit MC3. The voltages $V_{ref1}$, $V_{ref2}$, $V_{ref3}$, $V_{ref4}$ are applied respectively to the comparators CP1', CP2', CP3', CP4', wherein each receive the voltage VT on their second input.

Figure 19:
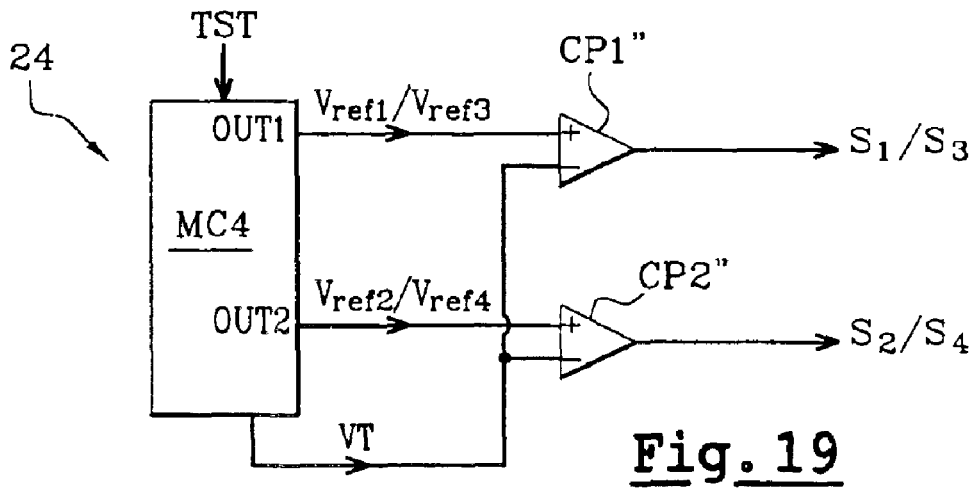
FIG. 19 represents a fourth embodiment of a temperature sensor of the type represented in FIG. 3.

Also, FIG. 19 represents a sensor 24 which exhibits the same structure as the sensor 22 described above in relation to FIG. 13, wherein a measuring circuit MC4 replaces the measuring circuit MC2. The circuit MC4 delivers on an output OUT1 the voltage $V_{ref1}$ or the voltage $V_{ref3}$ according to the value of the signal TST, and on an output OUT2 the voltage $V_{ref2}$ or the voltage $V_{ref4}$ according to the value of the signal TST, and delivers also the voltage VT. Thus, the comparator CP1" receives on an input the voltage $V_{ref1}$ or the voltage $V_{ref3}$, on another input the voltage VT, and delivers the signal $S_1$ or the signal $S_3$. The comparator CP2" receives on an input the voltage $V_{ref2}$ or the voltage $V_{ref4}$, on another input the voltage VT, and delivers the signal $S_2$ or the signal $S_4$. As previously, the voltages $V_{ref1}$ and $V_{ref3}$ are linked, the voltages $V_{ref2}$ and $V_{ref4}$ are linked, and the voltages $V_{ref1}$ and $V_{ref2}$ are preferably linked.

Moreover, although it has been suggested in the foregoing to offset both thresholds $T_1$ and $T_2$ to form the both offset thresholds $T_3$ and $T_4$, it falls within the framework of the invention to provide several offset thresholds for each threshold to be tested. For example, two detection thresholds $T_3$ and $T_5$ linked to the detection threshold $T_1$ can be generated, as well as two detection thresholds $T_4$ and $T_6$ linked to the detection threshold $T_2$.

Figure 20:
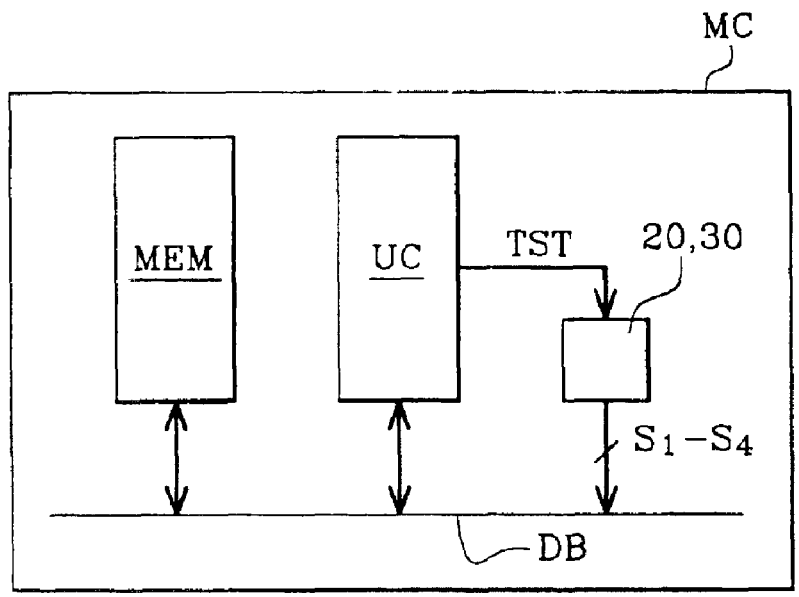
FIG. 20 illustrates an application of a temperature sensor according to the present invention.

A temperature sensor according to the invention is also susceptible to diverse applications. By way of example, FIG. 20 represents diagrammatically an integrated circuit MC for a smart card, comprising a microprocessor based or wired-logic central unit UC, a memory MEM, and a sensor 20 or 30 according to the invention. The central unit CU applies the signal TST to the sensor 20, 30 during test periods. The signals $S_1$ to $S_4$ delivered by the sensor 20, 30 are accessible via a data bus DB.

That which is claimed is:

1. A temperature sensor integrated on a silicon chip and comprising:
    first threshold means for detecting a first temperature threshold of a temperature of the silicon chip, the first temperature threshold having a first detection threshold;
    second threshold means for detecting a second temperature threshold of the temperature of the silicon chip, the second temperature threshold having a second detection threshold;
    third threshold means for detecting a third temperature threshold of the temperature of the silicon chip, the third temperature threshold being between the first and second temperature thresholds, and having a third detection threshold linked with the first detection threshold so that a deviation of the first detection threshold causes a corresponding deviation of the third detection threshold; and
    fourth threshold means for detecting a fourth temperature threshold of the temperature of the silicon chip, the fourth temperature threshold being between the first and second temperature thresholds, and having a fourth detection threshold linked with the second detection threshold so that a deviation of the second detection threshold causes a corresponding deviation of the fourth detection threshold;
    the third and fourth temperature thresholds defining a temperature window to test the temperature sensor for detecting deviation of the first and second detection thresholds.

2. A temperature sensor according to claim 1, wherein the first temperature threshold is greater than the second temperature threshold while the third temperature threshold is less than the fourth temperature threshold.

3. A temperature sensor according to claim 1, wherein the first detection threshold is linked with the second detection threshold so that a deviation of the first detection threshold causes a corresponding deviation of the second detection threshold, and a deviation of the second detection threshold causes a corresponding deviation of the first detection threshold.

4. A temperature sensor according to claim 1, wherein two of said threshold means have detection thresholds linked when they have at least one common electrical element intervening in the detection of the temperature thresholds, the at least one common element comprising at least one of a current source, a resistor and a transistor.

5. A temperature sensor according to claim 1, wherein the temperature window is centered around a temperature within a range of about 20 to 30° C.

6. A temperature sensor according to claim 1, wherein the first temperature threshold is greater than 50° C., the second temperature threshold is less than 0° C., and the third and fourth temperature thresholds are within a range of about 0° C. and 50° C.

7. A temperature sensor according to claim 1, further comprising:
    signal means for delivering a first signal varying with temperature according to a first variation rule, a second signal varying with temperature according to a second variation rule, a third signal varying with temperature according to a third variation rule, and a fourth signal varying with temperature according to a fourth variation rule so that a deviation of the first signal implies a corresponding deviation of the third signal and a deviation of the second signal implies a corresponding deviation of the fourth signal;
    reference signal means for delivering at least one reference signal that does not vary or hardly varies with temperature; and
    compare means for comparing at least two of the four signals varying with temperature with the at least one reference signal, and delivering threshold detection signals for detecting an overshoot of at least two of the first, second, third and fourth temperature thresholds.

8. A temperature sensor according to claim 7, further comprising:
an input for receiving a selection signal for a detection threshold;
first select means for selecting the first or third signal varying with temperature according to a value of the selection signal;
second select means for selecting the second or fourth signal varying with temperature according to the value of the selection signal; and
wherein said compare means compares the selected first or third signal and delivers a first or third threshold detection signal for detecting an overshoot of the first or third temperature threshold, and compares the selected second or fourth signal and delivers a second or fourth threshold detection signal for detecting an overshoot of the second or fourth temperature threshold.

9. A temperature sensor according to claim 1, further comprising:
an input for receiving a selection signal for a detection threshold;
signal means for delivering a first or third signal varying with temperature according to a value of the selection signal, and for delivering a second or a fourth signal varying with temperature according to the value of the selection signal;
reference signal means for delivering at least one reference signal that does not vary or hardly varies with temperature; and
compare means for comparing the delivered first or third signal with the at least one reference signal and delivering a first or third threshold detection signal for detecting an overshoot of the first or third temperature threshold, and for comparing the delivered second or fourth signal with the at least one reference signal and delivering a second or fourth threshold detection signal for detecting an overshoot of the second or fourth temperature threshold.

10. A temperature sensor according to claim 1, further comprising:
reference means for delivering a first reference signal that does not vary or hardly varies with temperature, a second reference signal that does not vary or hardly varies with temperature, a third reference signal that does not vary or hardly varies with temperature, a fourth reference signal that does not vary or hardly varies with temperature so that a deviation of the first signal implies a corresponding deviation of the third signal and a deviation of the second signal implies a corresponding deviation of the fourth signal;
signal means for delivering at least one signal varying with temperature; and
compare means for comparing each of the reference signals with the at least one signal varying with temperature, and delivering threshold detection signals for detecting an overshoot of at least two of the first, second, third and fourth temperature thresholds.

11. A temperature sensor according to claim further comprising:
an input for receiving a selection signal for a detection threshold;

first select means for selecting the first or third reference signal according to a value of the selection signal;
second select means for selecting the second or fourth reference signal according to the value of the selection signal; and
wherein said compare means compares the selected first or third reference signal with the at least one signal varying with temperature and delivers a first of third threshold detection signal for detecting an overshoot of the first or third temperature threshold, and compares the second or fourth referenc signal with the at least one signal varying with temperature and delivers a second or fourth threshold detection signal for detecting an overshoot of the second or fourth temperature threshold.

12. A temperature sensor according to claim 1, further comprising:
an input for receiving a selection signal for a detection threshold;
reference means for delivering a first or third reference signal according to a value of the selection signal, and for delivering a second or a fourth reference signal according to the value of the selection signal; and
compare means for comparing the first and third reference signals with the at least one signal varying with temperature and delivering a first or a third threshold detection signal for detecting an overshoot of the first or the third temperature threshold, and for comparing the second and fourth reference signals with the at least one signal varying with temperature and delivering a second or fourth threshold detection signal for detecting an overshoot of the second or fourth temperature threshold.

13. A temperature sensor integrated on a silicon chip and comprising:
a measurement circuit for
detecting a first temperature threshold of a temperature of the silicon chip, the first temperature threshold having a first detection threshold,
detecting a second temperature threshold of the temperature of the silicon chip, the second temperature threshold having a second detection threshold,
detecting a third temperature threshold of the temperature of the silicon chip, the third temperature threshold being between the first and second temperature thresholds, and having a third detection threshold linked with the first detection threshold so that a deviation of the first detection threshold causes a corresponding deviation of the third detection threshold, and
detecting a fourth temperature threshold of the temperature of the silicon chip, the fourth temperature threshold being between the first and second temperature thresholds, and having a fourth detection threshold linked with the second detection threshold so that a deviation of the second detection threshold causes a corresponding deviation of the fourth detection threshold,
the third and fourth temperature thresholds defining a temperature window to test the temperature sensor for detecting deviation of the first and second detection thresholds.

14. A temperature sensor according to claim 9, wherein the first temperature threshold is greater than the second temperature threshold while the third temperature threshold is less than the fourth temperature threshold.

17

15. A temperature sensor according to claim 9, wherein the first detection threshold is linked with the second detection threshold so that a deviation of the first detection threshold causes a corresponding deviation of the second detection threshold, and a deviation of the second detection threshold causes a corresponding deviation of the first detection threshold.

16. A temperature sensor according to claim 9, wherein the temperature window is centered around a temperature within a range of about 20 to 30° C.

17. A temperature sensor according to claim 9, wherein the first temperature threshold is greater than 50° C., the second temperature threshold is less than 0° C., and the third and fourth temperature thresholds are within a range of about 0° C. and 50° C.

18. A temperature sensor according to claim 13, wherein said measurement circuit delivers
 a first signal varying with temperature according to a first variation rule, a second signal varying with temperature according to a second variation rule, a third signal varying with temperature according to a third variation rule, and a fourth signal varying with temperature according to a fourth variation rule so that a deviation of the first signal implies a corresponding deviation of the third signal and a deviation of the second signal implies a corresponding deviation of the fourth signal,
 at least one reference signal that does not vary or hardly varies with temperature; and further comprising a comparator circuit for comparing at least two of the four signals varying with temperature with the at least one reference signal, and delivering threshold detection signals for detecting an overshoot of at least two of the first, second, third and fourth temperature thresholds.

19. A temperature sensor according to claim 18, further comprising:
 an input for receiving a selection signal for a detection threshold;
 a first select circuit for selecting the first or third signal varying with temperature according to a value of the selection signal;
 a second select circuit for selecting the second or fourth signal varying with temperature according to the value of the selection signal; and
 wherein said comparator circuit compares the selected first or third signal and delivers a first or third threshold detection signal for detecting an overshoot of the first or third temperature threshold, and compares the selected second or fourth signal and delivers a second or fourth threshold detection signal for detecting an overshoot of the second or fourth temperature threshold.

20. A temperature sensor according to claim 13, further comprising an input for receiving a selection signal for a detection threshold; wherein said measurement circuit delivers:
 a first or a third signal varying with temperature according to a value of the selection signal,
 a second or a fourth signal varying with temperature according to the value of the selection signal, and at least one reference signal that does not vary or hardly varies with temperature; and
 further comprising a comparator circuit for comparing the delivered third signal with the at least one reference signal and delivering a first or third threshold detection signal for detecting an overshoot of the first or the third temperature threshold, and for comparing the delivered

18 second or fourth signal with the at least one reference signal and delivering a second or fourth threshold detection signal for detecting an overshoot of the second or fourth temperature threshold.

21. A temperature sensor according to claim 13, wherein said measurement circuit delivers:
 a first reference signal that does not vary or hardly varies with temperature, a second reference signal that does not vary or hardly varies with temperature, a third reference signal that does not vary or hardly varies with temperature, a fourth reference signal that does not vary or hardly varies with temperature so that a deviation of the first signal implies a corresponding deviation of the third signal and a deviation of the second signal implies a corresponding deviation of the fourth signal, and
 at least one signal varying with temperature; and
 further comprising a comparator circuit for comparing at least two of the four reference signals with the at least one signal varying with temperature, and delivering threshold detection signals for detecting an overshoot of at least two of the first, second, third and fourth temperature thresholds.

22. A temperature sensor according to claim 21, further comprising:
 an input for receiving a selection signal for a detection threshold;
 a first select circuit for selecting the first or third reference signal according to a value of the selection signal; and
 a second select circuit for selecting the second or fourth reference signal according to the value of the selection signal; and
 wherein said comparator circuit compares the selected first or third reference signal with the at least one signal varying with temperature and delivers a first or third threshold detection signal for detecting an overshoot of the first or the third temperature threshold; and compares the second or fourth reference signal with the at least one signal varying with temperature and delivers a second or fourth threshold detection signal for detecting an overshoot of the second or fourth temperature threshold.

23. A temperature sensor according to claim 13, further comprising an input for receiving a selection signal for a detection threshold; wherein said measurement circuit delivers
 a first or a third reference signal according to a value of the selection signal,
 a second or a fourth reference signal according to the value of the selection signal, and
 at least one signal varying with temperature; and
 further comprising a comparator circuit for comparing the first and third reference signals with the at least one signal varying with temperature and delivering a first or third threshold detection signal for detecting an overshoot of the first or the third temperature threshold, and for comparing the second and fourth reference signal with the at least one signal varying with temperature and delivering a second or fourth threshold detection signal for detection an overshoot of the second or fourth temperature threshold.

24. A method for testing detection thresholds of a temperature sensor integrated on a silicon chip delivering threshold detection signals for detecting an overshoot of at least two temperature thresholds, the temperature sensor having a first detection threshold for a first temperature threshold of a temperature of the silicon chip and a second detection threshold for a second threshold temperature of the temperature of the silicon chip, the method comprising:

offsetting the first detection threshold to obtain a third detection threshold for a third temperature threshold of the temperature of the silicon chip, the third temperature threshold being between the first and second temperature thresholds so that the third detection threshold is linked with the first detection threshold and a deviation of the first detection threshold causes a corresponding deviation of the third detection threshold;

offsetting the second detection threshold to obtain a fourth detection threshold for a fourth temperature threshold of the temperature of the silicon chip, the fourth temperature threshold being between the first and second temperature thresholds so that the fourth detection threshold is linked with the second detection threshold and a deviation of the second detection threshold causes a corresponding deviation of the fourth detection threshold; and observing the threshold detection signals delivered by the temperature sensor while adhering to a temperature window between the third and fourth temperature thresholds.

25. A method according to claim 24, wherein the first temperature threshold is greater than the second temperature threshold, and the third temperature threshold is less than the fourth temperature threshold.

26. A method according to claim 24, wherein the first and second detection thresholds are linked so that a deviation of the first detection threshold causes a corresponding deviation of the second detection threshold, and a deviation of the second detection threshold causes a corresponding deviation of the first detection threshold.

27. A method according to claim 24, wherein the temperature sensor is tested at a single temperature.

28. A method according to claim 24, wherein the temperature window is centered around a temperature within a range of about 20 to 30° C.

29. A method according to claim 24, wherein the first temperature threshold is greater than 50° C., the second threshold temperature is less than 0° C., and the third and fourth temperature thresholds are within a range of about 0° C. and 50° C.

30. A method according to claim 24, wherein offsetting the first or second detection threshold comprises modifying a value of at least one electrical parameter in the temperature sensor, the at least one electrical parameter comprising at least one of a bias current and a resistor.

31. A method according to claim 24, wherein offsetting the first detection threshold to obtain the third detection threshold comprises:

detecting the first temperature threshold having the first detection threshold, and detecting the third temperature threshold having the third detection threshold linked with the first detection threshold so that the deviation of the first detection threshold causes the corresponding deviation of the third detection threshold; and wherein offsetting the second detection threshold to obtain the fourth detection threshold comprises:

detecting the second temperature threshold having the second detection threshold, and detecting the fourth temperature threshold having the fourth detection threshold linked with the second detection threshold so that the deviation of the second detection threshold causes the corresponding deviation of the fourth detection threshold.

32. A method according to claim 31, wherein the integrated temperature sensor comprises respective threshold detection means for detecting the temperature thresholds, wherein two of the threshold detection means have detection thresholds linked when they have at least one common electrical element intervening in the detection of the temperature thresholds, the at least one common electrical element comprising at least one of a current source, a resistor and a transistor.

33. A method according to claim 31, wherein the temperature sensor further comprises two multiplexed outputs driven by a threshold selection signal, one of the outputs delivering a first or third threshold detection signal for detecting an overshoot of the first threshold or third threshold, and a second or fourth threshold detection signal for detecting an overshoot of the second threshold or fourth threshold.

* * * * *

UNITED STATES PATENT AND TRADEMARK OFFICE
CERTIFICATE OF CORRECTION

PATENT NO. : 6,997,606 B2 Page 1 of 11
APPLICATION NO. : 10/325491
DATED : February 14, 2006
INVENTOR(S) : Marinet et al.

It is certified that error appears in the above-identified patent and that said Letters Patent is hereby corrected as shown below:

Delete column 1 line 1 through column 20 line 44 and insert column 1 line 1 through column 20 line 35 as attached.

Signed and Sealed this

Twenty-fourth Day of August, 2010

David J. Kappos
*Director of the United States Patent and Trademark Office*

THRESHOLD TEMPERATURE SENSOR COMPRISING ROOM TEMPERATURE TEST MEANS

FIELD OF THE INVENTION

The present invention relates to integrated temperature sensors, and more particularly, to a threshold temperature sensor.

BACKGROUND OF THE INVENTION

Temperature sensors are frequently provided in integrated circuits to detect when the operating temperature limits provided by the manufacturer have been exceeded, for example +100° C. and −30° C. These temperature sensors deliver detection signals that change values when one of these temperatures is exceeded.

To detect these critical temperature thresholds, integrated temperature sensors use the properties of diodes or bipolar transistors to generate currents or voltages proportional to the temperature, as well as reference currents or voltages that do not vary or hardly vary with temperature. A comparison of the voltages or currents varying with temperature, and of the reference voltages or currents enables detection when critical temperature thresholds have been exceeded.

FIG. 1 represents an integrated temperature sensor 10 of the type mentioned above. The temperature sensor 10 delivers two signals $S_1$ and $S_2$ whose value depends on the temperature of the sensor, i.e., the temperature of the silicon wafer on which the sensor is integrated.

FIGS. 2A and 2B represent examples of signals $S_1$ and $S_2$. The signal $S_1$ is, for example, equal to 0 as long as a threshold $T_1$ has not been reached, for example +100° C., and goes to 1 when the threshold $T_1$ is exceeded. The signal $S_2$ is, for example, equal to 0 as long as a threshold $T_2$ has not been reached, for example −30° C., and goes to 1 when the threshold $T_2$ is exceeded. Because of errors in manufacture when integrating the sensor, the detection thresholds of the temperatures $T_1$ and $T_2$ can vary over a wide range of values. The error may be caused by dispersions of the manufacturing method when implanting the electronic components, and by variations in the supply voltage of the sensor.

Tolerance margins $T_1$-$T_1$- and $T_2$-$T_2$- are defined for which the temperature sensor is considered as valid. For a threshold $T_1$ of 100° C., the temperature $T_1$, and $T_1$- are, for example, equal to 90° C. and 110° C., i.e., a tolerance margin of ±10° C. For a threshold $T_2$ equal to −30° C., the temperatures $T_2$, and $T_2$- are, for example, equal to −40° C. and −20° C.

It is therefore advisable to check the detection thresholds of such a temperature sensor. Such a verification can, for example, take place during electrical testing of the integrated circuit where the sensor is incorporated. This enables one to make sure that the detection thresholds correspond to the temperatures $T_1$ and $T_2$, or at the very least, that they adhere to the tolerance margins $T_1$-$T_1$- and $T_2$-$T_2$-.

Still, verification of the detection thresholds requires the silicon wafer to be heated to the temperatures $T_1$ and $T_2$, which are generally far apart from one another. One is very high and the other is very low in order to verify that the signals $S_1$ and $S_2$ change values. Moreover, verification that the detection thresholds adhere effectively to the tolerance margins $T_1$-$T_1$- and $T_2$-$T_2$- require that that at least four test temperatures $T_1$, $T_1$-, $T_2$, $T_2$- are provided. Thus, testing a temperature sensor in an integrated circuit is a rather complex and expensive procedure to implement.

SUMMARY OF THE INVENTION

In view of the foregoing background, an object of the present invention is to enable room temperature testing of the detection thresholds of a temperature sensor of the type mentioned above.

This and other objects, advantages and features in accordance with the present invention are met by an integrated temperature sensor delivering overshoot detection signals of temperature thresholds, and comprising means for detecting a first temperature threshold exhibiting a first detection threshold, and means for detecting a second temperature threshold exhibiting a second detection threshold.

The sensor may further comprise means for detecting a third temperature threshold between the first and second temperature thresholds. The third detection threshold may be linked with the first detection threshold so that a deviation of the first detection threshold causes a corresponding deviation of the third detection threshold. The sensor may also comprise means for detecting a fourth temperature threshold between the first and second temperature thresholds. The fourth detection threshold may be linked with the second detection threshold so that a deviation of the second detection threshold causes a corresponding deviation of the fourth detection threshold. The third and fourth temperature thresholds delineate a temperature window for testing the temperature sensor for detecting a deviation of the first and second detection thresholds.

The first temperature threshold may be greater than the second temperature threshold while the third temperature threshold is less than the fourth temperature threshold. The first detection threshold may be linked with the second detection threshold so that a deviation of the first detection threshold causes a corresponding deviation of the second detection threshold, and vice versa.

According to one embodiment, the sensor comprises means to deliver a first signal varying with temperature according to a first variation law, a second signal varying with temperature according to second variation law, a third signal varying with temperature according to a third variation law, and a fourth signal varying with temperature according to a fourth variation law so that a deviation of the first signal implies a corresponding deviation of the third signal as well as a deviation of the second signal implies a corresponding deviation of the fourth signal.

The sensor may also comprise means to deliver at least one reference signal that does not vary or hardly varies with temperature, and means to compare each of the signals varying with temperature with the reference signal. Detection signals are delivered when the first, second, third and fourth temperature thresholds have been exceeded.

According to one embodiment, the sensor comprises an input to receive a selection signal for a detection threshold. The sensor may also comprise means to select the first or the third signal varying with temperature according to the value of the selection signal, compare the signal selected with the reference signal and deliver an overshoot detection signal of the first or of the third temperature threshold. There is also means to select the second or the fourth signal varying with temperature according to the value of the selection signal, compare the signal selected with the reference signal, and deliver an overshoot detection signal of the second or of the fourth temperature threshold.

According to another embodiment, the sensor comprises an input to receive a selection signal of a detection threshold, means to deliver the first or the third signal varying with temperature according to the value of the selection signal, and means to deliver the second or the fourth signal varying with temperature according to the value of the selection signal. The temperature sensor further comprises means to compare the signal delivered with the reference signal and deliver an overshoot detection signal of the first or of the third temperature threshold, and means to compare the signal delivered with the reference signal and deliver an overshoot detection signal of the second or of the fourth temperature threshold.

According to one embodiment, the sensor comprises means to deliver a first reference signal that does not vary or hardly varies with temperature, a second reference signal that does not vary or hardly varies with temperature, a third reference signal that does not vary or hardly varies with temperature, a fourth reference signal that does not vary or hardly varies with temperature so that a deviation of the first signal implies a corresponding deviation of the third signal and a deviation of the second signal implies a corresponding deviation of the fourth signal. The sensor may also comprise means to deliver at least one signal varying with temperature, and means to compare each of the reference signals with the signal varying with temperature, and deliver overshoot detection signals of the first, second, third and fourth temperature thresholds.

According to another embodiment, the sensor comprises an input to receive a selection signal of a detection threshold, means to select the first or the third reference signal according to the value of the selection signal, compare the signal selected with the signal varying with temperature and deliver an overshoot detection signal or the first or of the third temperature threshold. The sensor may also comprise means to select the second or the fourth reference signal according to the value of the selection signal, compare the signal selected with the signal varying with temperature and deliver in overshoot detection signal of the second or of the fourth temperature threshold.

According to yet another embodiment, the sensor comprises an input to receive a selection signal of a detection threshold, means to deliver the first or the third reference signal according to the value of the selection signal, and means to deliver the second or the fourth reference signal according to the value of the selection signal. The sensor may also comprise means to compare the signal delivered with the signal varying with temperature and deliver an overshoot detection signal of the first or of the third temperature threshold, and means to compare the signal delivered with the signal varying with temperature, and deliver an overshoot detection signal of the second or of the fourth temperature threshold.

Two detection means exhibit detection thresholds linked when they exhibit at least one common electrical element intervening in the detection of the temperature thresholds, such as a current source, an electrical resistor or a transistor. The temperature window may be centered on a temperature on the order of 20 to 30° C. The first temperature threshold may be greater than 50° C., the second temperature threshold may be less than 0° C., and the third and fourth temperature thresholds may be between 0° C. and 50° C.

The present invention also concerns a method to test detection thresholds of an integrated temperature sensor delivering overshoot detection signals of at least two temperature thresholds. The temperature sensor exhibits a first detection threshold of a first temperature threshold, and a second detection threshold of a second threshold temperature. The method preferably comprises offsetting the first detection threshold to obtain a third detection threshold of a third temperature threshold between the first and the second temperature thresholds so that the third detection threshold is linked with the first detection threshold, and a deviation of the first detection threshold causes a corresponding deviation of the third detection threshold. The second detection threshold is preferably offset to obtain a fourth detection threshold of a fourth temperature threshold between the first and second temperature thresholds so that the fourth detection threshold is linked with the second detection threshold, and a deviation of the second detection threshold causes a corresponding deviation of the fourth detection threshold. The threshold detection signals delivered by the temperature sensor are observed while adhering to a temperature window between the third and fourth temperature thresholds.

The temperature sensor is laid out so that the first temperature threshold is greater than the second temperature threshold, and that the third temperature threshold is less than the fourth temperature threshold. The first and the second detection thresholds may be linked so that a deviation of the first detection threshold causes a corresponding deviation of the second detection threshold, and vice-versa.

The temperature sensor may be tested at a single temperature. The temperature window may be centered on a temperature on the order of 20 to 30° C. The first temperature threshold is greater than 50° C., the second threshold temperature is less than 0° C., and the third and fourth temperature thresholds are between 0° C. and 50° C.

According to one embodiment, the step of offsetting the first detection threshold towards the third detection threshold comprises providing, in the temperature sensor, detection means of the first temperature threshold exhibiting a first detection threshold, and detection means of the third temperature threshold exhibiting a third detection threshold linked with the first detection threshold so that a deviation of the first detection threshold causes a corresponding deviation of the third detection threshold. The detection means of the third temperature threshold are used during the test of the temperature sensor. The method may further include offsetting the second detection threshold towards the fourth detection threshold and comprises providing, in the temperature sensor, detection means of the second temperature threshold exhibiting a second detection threshold, and detection means of the fourth temperature threshold exhibiting a fourth detection threshold linked with the second detection threshold so that a deviation of the second detection threshold causes a corresponding deviation of the fourth detection threshold. The detection means of the fourth temperature threshold are used during the test of the temperature sensor.

The detection thresholds of two detection means may be linked while providing in the detection means at least one common electrical element intervening in the detection of the temperature thresholds, such as a current source, an electrical resistor or a transistor.

The temperature sensor preferably contains two multiplexed outputs driven by a threshold selection signal, delivering respectively an overshoot detection signal of the first threshold or of the third threshold, and an overshoot detection signal of the second threshold or of the fourth threshold. The step of offsetting a detection threshold comprises the modification of the value of at least one electrical parameter in the temperature sensor, such as a bias current or an electrical resistor.

BRIEF DESCRIPTION OF THE DRAWINGS

These as well as other objects, characteristics and advantages of the present invention will be disclosed in more detail in the following description of the method of the invention and of diverse embodiments of temperature sensors according to the invention, non-limiting in relation to the appended figures in which:

FIG. 1 represents diagrammatically a threshold temperature sensor according to the prior art;

FIGS. 2A and 2B represent two detection signals delivered by the temperature sensor of FIG. 1;

FIG. 3 represents diagrammatically a first type of threshold temperature sensor according to the present invention;

FIG. 4 represents diagrammatically a second type of temperature sensor according to the present invention;

FIGS. 5A and 5B represent offset detection signals delivered by a threshold temperature sensor and illustrate a first implementation example of the method according to the present invention;

FIGS. 6A and 6B represent offset detection signals delivered by a temperature sensor and illustrate a second implementation example of the method according to the present invention;

FIGS. 7A and 7B represent offset detection signals delivered by a temperature sensor and illustrate a third implemenation example of the method according to the present invention;

FIG. 8 illustrates a first embodiment of a temperature sensor of the type represented in FIG. 3;

FIG. 9 represents a first embodiment of a temperature sensor of the type represented in FIG. 4;

FIG. 10 represents a measuring circuit available in a temperature sensor according to one of FIGS. 8 or 9;

FIG. 11 represents one embodiment variation of a measuring stage available in the measuring circuit of FIG. 10;

FIG. 12 represents another embodiment variation of a measuring stage available in the measuring circuit of FIG. 10;

FIG. 13 represents a second embodiment of a temperature sensor of the type represented in FIG. 3;

FIG. 14 represents one embodiment of a measuring stage available in the temperature sensor of FIG. 13;

FIG. 15 represents another embodiment of a measuring stage available in the temperature sensor of FIG. 13;

FIG. 16 represents one embodiment example of a bias circuit available in a temperature sensor according to the present invention;

FIG. 17 represents a third embodiment of a temperature sensor of the type represented in FIG. 3;

FIG. 18 represents a second embodiment of a temperature sensor of the type represented in FIG. 4;

FIG. 19 represents a fourth embodiment of a temperature sensor of the type represented in FIG. 3; and FIG. 20 illustrates an application of a temperature sensor according to the present invention.

DETAILED DESCRIPTION OF THE PREFERRED EMBODIMENTS

In the following description, "detection threshold of a temperature X" designates a detection threshold internal to a temperature sensor. This is provided to correspond to the detection of a temperature X. This signal is likely to exhibit a deviation and will no longer correspond to the temperature. For purposes of simplifying the following description, "detection threshold X" designates the detection threshold of the temperature X, and "threshold X" designates the detection threshold of the temperature X or the temperature threshold X, according to the context.

FIG. 3 represents diagrammatically an integrated temperature sensor 20 according to the invention. The temperature sensor exhibits outputs OUT1 and OUT2 which deliver conventionally a normal operating mode of the sensor, that is, two detection signals $S_1$ and $S_2$ as already described above and as represented in FIGS. 2A and 2B. Thus, the signal $S_1$ changes values and goes to 1, for example, when a threshold $T_1$ is exceeded, for example, a threshold equal to +100° C. The signal $S_2$ changes values and goes to 1, for example, when a threshold $T_2$ is exceeded, for example, a threshold equal to −30° C.

According to the invention, the temperature sensor 20 exhibits an input receiving a signal TST (TEST) for switching the temperature sensor to a special operating or test mode wherein the outputs OUT1, OUT2 no longer deliver the signals $S_1$ and $S_2$, but deliver signals $S_3$ and $S_4$ for respectively detecting offset temperature thresholds $T_3$ and $T_4$, which are close to one another and close to a test temperature $T_t$. The test temperature $T_t$ is preferably the temperature of a test room, i.e., generally 25° C., assuming the integrated circuits to be tested are situated at this temperature.

According to one essential aspect of the invention, the detection threshold of the temperature $T_3$ is linked with the detection threshold of the temperature $T_1$, and the detection threshold of the temperature $T_4$ is linked with the detection threshold of the temperature $T_2$. This is so that a deviation of the detection threshold of the temperature $T_1$ is expressed by a corresponding deviation of the detection threshold of the temperature $T_3$, and a deviation of the detection threshold of the temperature $T_2$ is expressed by a corresponding deviation of the detection threshold of the temperature $T_4$.

Preferably, the detection thresholds of the temperatures $T_1$ and $T_2$ are also linked so that a deviation in the detection of any of the temperatures $T_1$ or $T_2$ implies a corresponding deviation in the detection of the other temperatures $T_2$ or $T_1$, $T_3$ and $T_4$.

It can be derived from the following that four linked detection thresholds enables testing of the detection thresholds of the temperatures $T_1$ and $T_2$ with a single test temperature. It will also appear in the following that detection thresholds which are linked in terms of deviation can be easily obtained by a temperature measuring means with common elements, notably current sources and/or voltage sources, resistors, transistors, etc.

FIGS. 5A and 5B, 6A and 6B, 7A and 7B illustrate three non-limiting implementation examples of the method according to the invention. The temperature thresholds $T_1$ and $T_2$ are respectively equal to +100° C. and −30° C., and the sensor is to be tested at a temperature $T_t$ on the order of 25° C.

In FIGS. 5A and 5B, the signal S3 exhibits a detection threshold $T_3$ equal to 36° C. corresponding to the offset of the threshold $T_1$ towards the test temperature $T_t$. The threshold $T_3$ is selected so that a temperature range $T_{3^-}T_{3^+}$ corresponding to a set tolerance margin, such as the range 26° C.–46° C. corresponding to a tolerance of ±10°, for example, is situated on the right-hand edge of the temperature $T_t$. Besides, the signal $S_4$ exhibits a detection threshold $T_4$ equal to 14° C. corresponding to an offset of the threshold $T_2$ towards the temperature $T_t$, selected so that a temperature range $T_{4^-}T_{4^+}$ corresponding to a set tolerance margin, for example 4° C.–24° C., is situated on the left-hand edge of the test temperature.

The advantages of the method according to the invention in this example are as follows. First, if the thresholds $T_1$ and $T_3$, respectively $T_2$ and $T_4$, are linked, but the thresholds $T_1$ and $T_2$ are not, a test sequence conducted at temperature $T_t$ that includes observing the signals $S_3$ and $S_4$ (which must be equal to 0), enables detection of a left-hand offset of the threshold $T_3$ outside the tolerance margin (signal $S_3$ at 1) or a right-hand offset of the threshold $T_4$ outside the tolerance margin (signal $S_4$ at 1). If the thresholds $T_1$ and $T_3$, respectively $T_2$ and $T_4$, are linked, it can be determined that the threshold(s) $T_1$, $T_2$ of the sensor are not situated within the tolerance margin. Conversely, detecting a right-hand offset of the threshold $T_3$ or a left-hand offset of the threshold $T_4$ outside the tolerance margin calls for two other test temperatures, respectively $T_4$, (+4° C.) and $T_3$, (+46° C.), to delineate the test zone.

If, conversely, the thresholds $T_1$ and $T_2$ are linked, a single test sequence conducted at temperature $T_t$ that includes observing the signals $S_3$ and $S_4$ (which must be equal to 0), enables one to simultaneously detect a left-hand or right-hand offset of the threshold $T_3$ outside the tolerance margin (signal $S_3$ at 1) or a right-hand offset of the threshold $T_4$ outside the tolerance margin (signal $S_4$ at 1). The test sequence at temperature $T_t$ enables one to verify simultaneously that the thresholds $T_1$ and $T_2$ are situated within the tolerance margins $T_1\text{-}T_1$. and $T_2\text{-}T_2$.. This can be understood easily in reference to FIGS. 2A, 2B, 5A and 5B while considering that the four tolerance margins $T_1\text{-}T_1$., $T_2\text{-}T_2$., $T_3\text{-}T_3$., $T_4\text{-}T_4$. offset together to the right or to the left (the detection thresholds $T_1$, $T_2$, $T_3$ and $T_4$ are linked). A collective offset, however small, will cause the value of one of the test signals $S_3$ or $S_4$ to change with respect to the expected value (here 0).

In FIGS. 6A and 6B, the detection thresholds offset $T_3$ and $T_4$ are interlaced. The signal $S_3$ exhibits a threshold $T_3$ equal to 14° C., corresponding to the offset of the left-hand threshold $T_1$ of the test temperature $T_t$. The signal $S_4$ exhibits a detection threshold $T_4$ equal to 36° C., corresponding to the offset of the right-hand threshold $T_2$ of the temperature $T_t$. The threshold $T_3$ is selected so that a temperature range $T_3\text{-}T_3$. corresponding to a set tolerance margin, such as the range 4° C.-24° C. corresponding to a tolerance of ±10°, for example, is situated on the left-hand edge of the temperature $T_t$. The threshold $T_4$ is selected so that the temperature range $T_4\text{-}T_4$. corresponding to the set tolerance margin, such as the range 26° C.-46° C., for example, is situated on the right-hand edge of the temperature $T_t$.

This implementation example offers the same advantages as described above. Another advantage due to the fact that the detection thresholds are interlaced is that the signals $S_3$ and $S_4$ are equal to 1 when the sensor is at the test temperature $T_t$, which enables one to verify that the means for switching the signals of the sensor operate correctly. Thus, if the detection thresholds $T_1$ and $T_3$, respectively $T_2$ and $T_4$ are linked, but the thresholds $T_1$ and $T_2$ are not, a single test sequence conducted at temperature $T_t$, which includes observing the values of the signals $S_3$ and $S_4$ (which must now be equal to 1), enables one to detect a right-hand offset of the threshold $T_3$ outside the tolerance margin (signal $S_3$ at 0) or a left-hand offset of the threshold $T_4$ outside the tolerance margin (signal $S_4$ to 0).

Conversely, the detection of a left-hand offset of the threshold $T_3$ and a right-hand offset of the threshold $T_4$ outside the tolerance margin calls for two other test temperatures to be provided, respectively $T_3$, (+4° C.) and $T_4$, (+46° C.). If conversely, the thresholds $T_1$ and $T_2$ are linked, a single test sequence conducted at temperature $T_t$ enables detection of a left-hand or right-hand offset of the threshold $T_3$ outside the tolerance margin (signal $S_3$ at 0) or a right-hand offset of the threshold $T_4$ outside the tolerance margin (signal $S_4$ at 0). This enables one to verify in a single phase that the thresholds $T_1$ and $T_2$ lie within the tolerance margins $T_1\text{-}T_2$. and $T_2\text{-}T_2$..

In FIGS. 7A and 7B, the detection thresholds $T_3$ and $T_4$ are still interlaced but respectively exhibit an additional deviation to the left (towards negative temperatures) and to the right (towards positive temperatures). For example, $T_3$ is equal to 10° C. and $T_4$ equal to 40° C., the tolerance margin $T_3\text{-}T_3$. is equal to 0° C.-10° C. and the tolerance margin $T_4\text{-}T_4$. equal to 30° C.-50° C. Here is an additional degree of freedom with regards to the selection of the test temperature $T_t$, which can lie between the temperatures $T_3$. and $T_4$., i.e., between 20° C. and 30° C. The sensor can in such a case be tested with less control of the temperature of the test room, at a test temperature between 20° C. and 30° C. enabling one to verify simultaneously that the thresholds $T_1$ and $T_2$ lie within the tolerance margins $T_1\text{-}T_1$. and $T_2\text{-}T_2$. (while neglecting the tolerance margin $T_3\text{-}T_4$.).

Diverse embodiment examples of temperature sensors according to the invention will now be described. It should be noted first that, although it is sufficient to implement the method of the invention, a temperature sensor may deliver the signals $S_3$ and $S_4$ instead of the signals $S_1$ and $S_2$ during the test phase. A sensor according to the invention can also exhibit two additional outputs to deliver the signals $S_3$ and $S_4$. Thus, the temperature sensor 30 represented in FIG. 4 exhibits two outputs OUT1 and OUT2 delivering the signals $S_1$ and $S_2$, the two outputs OUT3 and OUT4 delivering signals $S_3$ and $S_4$ having detection thresholds linked with those of the signals $S_1$ and $S_2$. The outputs OUT3, OUT4 and the signals $S_3$, $S_4$ are used during the test phases of the sensor, instead of the outputs OUT1, OUT2 and signals $S_1$, $S_2$. Such a "use" of the signals $S_3$, $S_4$ instead of the signals $S_1$, $S_2$ is equivalent, in terms of the method, to a transformation of the signal $S_1$ into a signal $S_3$ and to a transformation of the signal $S_2$ into a signal $S_4$. Both embodiments correspond to an offset of the detection thresholds $T_1$ and $T_2$ to form the close detection thresholds $T_3$ and $T_4$.

FIG. 8 represents one embodiment example of a temperature sensor 21 of the type represented in FIG. 3, exhibiting two outputs OUT1, OUT2 delivering the signals $S_1$, $S_2$ or $S_3$, $S_4$ according to the value of the signal TST. The sensor 21 comprises a measuring circuit MC1 delivering four voltages $VT_1$, $VT_2$, $VT_3$, $VT_4$ varying in proportion to the temperature according to different coefficients of proportionality, as well as a reference voltage $V_{ref}$ independent of the temperature. The voltages $VT_1$ and $VT_3$ are applied to the inputs of an analog multiplexer MX1 driven by the signal TST, and the voltages $VT_2$ and $VT_4$ are applied to the inputs of an analog multiplexer MX2 also driven by the signal TST. The output of the multiplexer MX1 delivers the voltage $VT_1$ or the voltage $VT_3$ according to the value of the signal TST, and is applied to the positive input of a comparator CP1 whose negative input receives the voltage $V_{ref}$ and whose output forms the output OUT1 of the sensor. The output of the multiplexer MX2 delivers the voltage $VT_2$ or the voltage $VT_4$ according to the value of the signal TST, and is applied to the negative input of a comparator CP2 whose positive input receives the voltage $V_{ref}$ and whose output forms the output OUT2 of the sensor.

FIG. 9 represents one embodiment example of a temperature sensor 31 of the type represented in FIG. 4, exhibiting four outputs OUT1, OUT2, OUT3, OUT4 delivering respectively the signals $S_1$, $S_2$, $S_3$, $S_4$. the sensor 21 comprises the measuring circuit MC1 mentioned above and four comparators CP1', CP2', CP3', CP4'. The comparator CP1' receives on its positive input the voltage $VT_1$, on its negative input the voltage $V_{ref}$ and delivers the signal $S_1$. The comparator CP2' receives on its negative input the voltage $VT_2$, on its positive input the voltage $V_{ref}$ and delivers the signal $S_2$. The comparator CP3' receives on its positive input the voltage $VT_3$, on its negative input the voltage $V_{ref}$ and delivers the signal $S_3$. The comparator CP4' receives on its negative input the voltage $VT_4$, on its positive input the voltage $V_{ref}$ and delivers the signal $S_4$.

FIG. 10 represents one embodiment example of the measuring circuit MC1. The latter comprises a bias circuit BC1, a reference stage RS1 delivering the voltage $V_{ref}$ and a measuring stage MS1 delivering the voltages $VT_1$, $VT_2$, $VT_3$ and $VT_4$. The circuit BC1 is powered by a voltage Vcc, and delivers a voltage $V(I_t)$ that should be applied to the gate of a transistor PMOS in order to form a source of current imposing a current $I_t$ proportional to the temperature T, of the type $I_t=\alpha T$, with $\alpha$ being a constant.

The reference stage RS1 comprises a transistor PMOS TP1 receiving the voltage Vcc on its source S and the voltage $V(I_t)$ on its gate G. The drain D of this transistor is connected to the end of a resistor $R_1$ whose other end is connected to the emitter E of a bipolar transistor TB1 of the type PNP having its base and its collector connected to ground (diode). The voltage $V_{ref}$ is drawn from the connection node of the drain D of the transistor TP1 and of the resistor $R_1$. The stage RS1 conducts through it the current $I_t$, and the resistor $R_1$ exhibits a value selected so that the voltage $V_{ref}$ is independent of the temperature, wherein:

$$V_{ref}=R_1 \cdot I_t + V_{be}(T) = R_1 \cdot \alpha T + V_{be}(T) = \text{Constant}$$

$V_{be}(T)$ is the emitter-base voltage of the transistor TB1, whose variations in relation to the temperature are compensated for by the variations of the term $R_1 \cdot \alpha T$.

The stage MS1 comprises a transistor PMOS TP2 receiving on its source S the voltage Vcc and on its gate G the voltage $V(I_t)$. The transistors TP2 and TP1 are thus laid out symmetrically for conducting current. The drain D of the transistor TP2 is connected to ground by five series resistors $R_{10}$, $R_{11}$, $R_{12}$, $R_{13}$, $R_{14}$. The cathode of the resistor $R_{14}$ is connected to ground. The voltage $VT_1$ is drawn from the anode of the resistor $R_{14}$, the voltage $VT_2$ is drawn from the anode of the resistor $R_{11}$, the voltage $VT_3$ is drawn from the anode of the resistor $R_{12}$, and the voltage $VT_4$ is drawn from the anode of the resistor $R_{13}$.

The detection thresholds of the temperatures $T_1$ to $T_4$ are linked, as readily understood by those skilled in art. A deviation of an operating point of the measuring circuit MC1 causes a corresponding deviation of the voltages $VT_1$, $VT_2$, $VT_3$ and $VT_4$ and consequently a deviation of detection thresholds. A deviation of the voltage $V_{ref}$ has an identical effect on the detection thresholds by acting on the triggering thresholds of the comparators. A deviation of the operating point can be due to a variation of the voltage $V(I_t)$, a variation of the voltage $V(I_t)$, a dispersion of the ratio W/L (gate width over length) of a transistor TP1 or TP2, a dispersion of the resistivity by square SQR of the material forming the resistors $R_1$, $R_{10}$ to $R_{14}$.

It should be noted that a deviation of a detection threshold $T_1$, $T_2$ causes a corresponding deviation of the offset detection threshold $T_3$, $T_4$ when the deviation is expressed as a percentage. Thus, for example, the detection threshold of the temperature $T_1$ that will be designated as $ST_1$ is defined by the following relation:

$$V_{ref}=VT_1$$

$$V_{ref}=R_{14} \cdot I$$

$$V_{ref}=R_{14} \cdot \alpha \cdot ST_1$$

$$ST_1=V_{ref}/R_{14} \cdot \alpha$$

Similarly, the detection threshold of the temperature $T_3$ that will be designated as $ST_3$ is defined by the following relation:

$$V_{ref}=VT_3$$

$$V_{ref}=(R_{12}+R_{13}+R_{14}) \cdot I$$

$$V_{ref}=(R_{12}+R_{13}+R_{14}) \cdot \alpha \cdot ST_3$$

$$ST_3=V_{ref}/(R_{12}+R_{13}+R_{14}) \cdot \alpha$$

The ratio between both thresholds is therefore:

$$ST_1/ST_3=V_{ref}/V_{ref} \cdot (R_{12}+R_{13}+R_{14})/R_{14} \cdot \alpha/\alpha$$

If one of the parameters $V_{ref}$, $\alpha$, SQR varies and causes a deviation of the thresholds $ST_1$ and $ST_3$, the ratio between the thresholds remains the same. For example, a 5% deviation of $ST_1$ causes a 5% deviation of $ST_3$.

It has been suggested in the foregoing, for simplification purposes, to provide for the offset thresholds $T_3$ and $T_4$ tolerance margins which are of the same value as the tolerance margins of the useful thresholds $T_1$ and $T_2$. In order to take into account the observation above, it is possible to provide a contraction of the tolerance margins defined for the thresholds $T_1$ and $T_2$ when the tolerance margins of the thresholds $T_3$ and $T_4$ are determined. On the other hand, the term "corresponding" in the expression "corresponding deviation" which is used in this description and in the claims, must be construed in the light of the observation above.

FIG. 11 represents a variation MS2 of the measuring stage. The stage MS2 comprises two transistors PMOS TP2-1, TP2-2 receiving the voltage Vcc on their sources S and the voltage $V(I_t)$ on their gates G. The drain D of the transsitor TP2-1 is connected to the ground by three series resistors $R_{20}$, $R_{21}$, $R_{22}$. The cathode of the resistor $R_{22}$ is connected to ground. The voltage $VT_1$ is drawn from the anode of the resistor $R_{22}$ and the voltage $VT_3$ is drawn from the anode of the resistor $R_{21}$. The drain D of the transistor TP2-2 is connected to ground by three series resistors $R_{23}$, $R_{24}$, $R_{25}$. The cathode of the resistor $R_{25}$ is connected to ground. The voltage $VT_2$ is drawn from the anode of the resistor $R_{24}$ and the voltage $VT_4$ is drawn from the anode of the resistor $R_{25}$.

The detection thresholds of the temperatures $T_1$ to $T_4$ are also linked in this embodiment in case of a variation of the parameters $V_{ref}$, $\alpha$ and SQR, unless there is an isolated error regarding the value of one of the resistors. There is little probability of the later happening. However, in such a case, the voltages $VT_1$ and $VT_3$ remain linked, and consequently the detection thresholds of the temperatures $T_1$ and $T_3$. The voltages $VT_2$ and $VT_4$ also remain linked, and consequently the temperature thresholds $T_2$ and $T_4$.

FIG. 12 represents another variation MS3 of the measuring stage. The stage M3 comprises four transistors PMOS TP2-1, TP2-2, TP2-3, TP2-4 each receiving the voltage Vcc on their sources S and the voltage $V(I_t)$ on their gates G. The drain D of the transistor TP2-1 is connected to ground by two series resistors, and the voltage $VT_1$ is drawn from the middle point of both resistors. Similarly, the drain of the transistor TP2-2 is connected to ground by two series resistors, and the voltage $VT_2$ is drawn from the middle point of both resistors. The drain of the transistor TP2-3 is connected to ground by two series resistors, and the voltage $VT_3$ is drawn from the middle point of both resistors. The drain of the transistors TP2-4 is connected to ground by two series resistors, and the voltage $VT_4$ is drawn from the middle point of both resistors.

The detection thresholds of the temperatures $T_1$ to $T_4$ are also linked in this embodiment, unless there is an isolated error regarding the value of one of the resistors. There is little probability of the later happening. The errors in resistivity due to a dispersion of the manufacturing method generally concern a whole set of resistors.

FIG. 13 represents one embodiment example of a temperature sensor 22 of the type represented in FIG. 3, exhibiting two outputs OUT1, OUT2 delivering the signals $S_1$, $S_2$ or $S_3$, $S_4$ according to the value of the signal TST. The sensor 22 comprises a measuring circuit MC2 receiving at input the signal TST, delivering on an output OUT1 the voltage $VT_1$ or the voltage $VT_3$ according to the value of the signal TST, delivering on an output OUT2 the voltage $VT_2$ or the voltage $VT_4$ according to the value of the signal TST, and delivering also the reference voltage $V_{ref}$ independent of the temperature. The voltage $VT_1/VT_3$ delivered by the output OUT1 is applied to the positive input of a comparator CP1" whose negative input receives the voltage $V_{ref}$. The output of the comparator CP1" forms the output OUT1. The voltage $VT_2/VT_4$ delivered by the output OUT2 is applied to the negative input of a comparator CP2" whose positive input receives the voltage $V_{ref}$. The output of the comparator CP2" forms the output OUT2.

FIG. 14 represents one embodiment example of a measuring stage MS4 that may be used in the circuit MC2 to generate the voltages $VT_1/VT_3$ and $VT_2/VT_4$. As previously, the measuring stage MS4 is biased by a voltage $V(I_r)$ delivered by a bias circuit (not represented). The measuring stage MS4 comprises a first group of two parallel transistors PMOS TP2-1, TP2-2, receiving the voltage Vcc on their sources. Their drains are interconnected and connected to ground by two series resistors RA, RB. The measuring stage MS4 comprises a second group of two parallel transistors PMOS TP2-3, TP2-4, receiving the voltage Vcc on their sources. Their drains are interconnected and connected to ground by two series resistors RA', RB'. The transistors TP2-1 and TP-3 receive on their gates the signal $V(I_r)$. The gate of the transistor TP2-2 receives the signal $V(I_r)$ via a switch transistor SW1, and the gate of the transistor TP2-4 receives the signal $V(I_r)$ via a switch transistor SW2. The switch SW1 is driven by the signal TST, and the switch SW2 is driven by an inverse signal /TST delivered by a inverting gate INV1.

According to the value of the signal TST, the switch SW1 is open (transistor SW1 blocked) and the switch SW2 closed (transistor SW2 conductive), or conversely. When SW1 is open and SW2 closed, a current equal to $I_r$ runs through the resistors RA, RB and a current equal to $2I_r$ runs through the resistors RA', RB'. The middle point of resistors RA, RB delivers the voltage $VT_1$ and the middle point of the resistors RA', RB' delivers the voltage VT. When SW1 is closed and SW2 open, a current equal to $2I_r$ runs through the resistors RA, RB and a current equal to $I_r$ runs through the resistors RA', RB'. The middle point of the resistors RA, RB delivers the voltage $VT_3$ and the middle point of the resistors RA', RB' delivers the voltage $VT_4$.

FIG. 15 represents another embodiment example of a measuring stage MS5 that may be used in the measuring circuit MC2. The generation of the voltages $VT_1/VT_3$ and $VT_2/VT_4$ are based on resistance-changing instead of current-changing. The measuring stage MS5 comprises two transistors PMOS TP2-1, TP2-2 receiving the voltage Vcc on their sources and the voltage $V(I_r)$ on their gates G. The drain of the transistor TP2-1 is connected to ground by four series resistors $R_a$, $R_b$, $R_c$, $R_d$. The cathode of the resistor $R_d$ is connected to ground. The drain of the transistor TP2-2 is connected to ground by four series resistors $R_{a'}$, $R_{b'}$, $R_{c'}$, $R_{d'}$. The cathode of the resistor $R_{d'}$ is connected to ground. A switch transistor SW1 driven by the signal TST is parallel with the resistor $R_b$. A switch transistor SW2 driven by the signal /TST is parallel with the transistor $R_c$. A switch transistor SW1' driven by the signal /TST is parallel with the resistor $R_{b'}$, and a switch transistor SW2' driven by the signal TST is parallel with the resistor $R_{c'}$.

When the switches SW1, SW2' are closed and the switches SW2, SW1' open, the resistors $R_b$, $R_{c'}$ are short-circuited. The anode of the resistor $R_c$ delivers the voltage $VT_1$ and the anode of the resistor $R_{c'}$ delivers the voltage $VT_2$. When the switches SW1, SW2' are open and the switches SW2, SW1' closed, the resistors $R_a$, $R_{b'}$ are short-circuited. The anode of the resistor $R_c$ delivers the voltage $VT_3$ and the anode of the resistor $R_{c'}$ delivers the voltage $VT_4$.

FIG. 16 represents one embodiment example of the basis circuit BC1 delivering the voltage $V(I_r)$. The circuit BC1 comprises two transistors PMOS TP10 and TP11 in parallel, receiving the voltage Vcc on their sources. The gates of transistors TP10, TP11 and the drain of the transistor TP11 are interconnected. The drain of the transistor TP10 is connected to the drain of a transistor NMOS TN10 whose source is connected to the emitter of a bipolar transistor TB10 having its base and its collector connected to ground. The drain of the transistor TP11 is connected to the drain of a transistor NMOS TN11 whose source is connected to the end of a resistor R30. The gates of the transistors TN10, TN11 and the drain of the transistor TN10 are interconnected. The other end of the resistor R30 is connected to the emitter of a bipolar transistor TB11 having its base and its collector connected to ground. The transistor TB11 is formed by 8 identical transistors TB11-1, TB11-2, ... TB11-8. The voltage $V(I_r)$ is drawn from the gates of the transistors TP10, TP11.

In such a circuit, the transistors TP10 and TP11 are laid out symmetrically for conducting current and conduct the same current $I_r$. The gate-source voltages of cascade transistors TN10, TN11 are identical, the base-emitter voltages $V_{be}$ of the transistors TB10 and TB11 are identical, and the currents running through the transistors TB11-i forming the transistor TB11 are 8 times smaller than the current $I_r$. It can be derived that:

$$I_r = \alpha T$$

with:

$$\alpha = k/q * ln(8)/r$$

k is Boltzman's constant, q is the load of the electron, ln is a logarithmic function, and r is the value of the resistor R30.

As described above, the gate voltage $V(I_r)$ enables one to impose the current $I_r$ in other parts of the sensor to generate the reference voltage $V_{ref}$ (a band gap voltage) and the voltages $VT_1$, $VT_2$, $VT_3$, $VT_4$ proportional to the temperature.

Such a temperature sensor according to the invention is susceptible to diverse other embodiments, as readily appreciated by those skilled in the art. Notably, although a detection of the temperature thresholds $T_1$, $T_2$, $T_3$, $T_4$ by voltages $VT_1$, $VT_2$, $VT_3$, $VT_4$ proportional to the temperature and a reference voltage $V_{ref}$ has been described in the foregoing, a temperature sensor according to the invention can also use several reference voltages and one or several voltages proportional to the temperature.

Thus, FIG. 17 represents a sensor 23 which exhibits the same structure as the sensor 21 described above in relation to FIG. 8, but wherein the measuring circuit MC1 is replaced with a measuring circuit MC3 which delivers four reference voltages $V_{ref1}$, $V_{ref2}$, $V_{ref3}$, $V_{ref4}$ and a voltage VT proportional to the temperature. The voltages $V_{ref1}$ and $V_{ref4}$ are linked in terms of deviation, the voltages $V_{ref2}$ and $V_{ref3}$ are linked, and the voltages $V_{ref1}$ and $V_{ref2}$ are preferably linked. The voltages $V_{ref1}$, $V_{ref3}$ are applied to the inputs of the multiplexer MX1 and the voltages $V_{ref2}$, $V_{ref4}$ are applied to the inputs of the multiplexer MX2. According to the value of the signal TST, the comparator CP1 compares the voltage $V_{ref1}$ or the voltage $V_{ref3}$ with the voltage VT, and delivers the signal $S_1$ or the signal $S_3$. Similarly, the comparator CP2 compares the voltage $V_{ref2}$ or the voltage $V_{ref4}$ with the voltage VT, and delivers the signal $S_2$ or the signal $S_4$.

In the same perspective, FIG. 18 represents a sensor 32 which exhibits the same structure as the sensor 31 described above in relation to FIG. 9, but wherein the measuring circuit MC1 is replaced with the measuring circuit MC3. The voltages $V_{ref1}$, $V_{ref2}$, $V_{ref3}$, $V_{ref4}$ are applied respectively to the comparator CP1', CP2', CP3', CP4', wherein each receive the voltage VT on their second input.

Also, FIG. 19 represents a sensor 24 which exhibits the same structure as the sensor 22 described above in relation to FIG. 13, wherein a measuring circuit MC4 replaces the measuring circuit MC2. The circuit MC4 delivers on an output OUT1 the voltage $V_{ref1}$ or the voltage $V_{ref3}$ according to the value of the signal TST, and on an output OUT2 the voltage $V_{ref2}$ or the voltage $V_{ref4}$ according to the value of the signal TST, and delivers also the voltage VT. Thus, the comparator CP1" receives on an input the voltage $V_{ref1}$ or the voltage $V_{ref3}$, on another input the voltage VT, and delivers the signal $S_1$ or the signal $S_3$. The comparator CP2" receives on an input the voltage $V_{ref2}$ or the voltage $V_{ref4}$, on another input the voltage VT, and delivers the signal $S_2$ or the signal $S_4$. As previously, the voltages $V_{ref1}$ and $V_{ref4}$ are linked, the voltages $V_{ref2}$ and $V_{ref3}$ are linked, and the voltages $V_{ref1}$ and $V_{ref2}$ are preferably linked.

Moreover, although it has been suggested in the foregoing to offset both thresholds $T_1$ and $T_2$ to form the both offset thresholds $T_3$ and $T_4$, it falls within the framework of the invention to provide several offset thresholds for each threshold to be tested. For example, two detection thresholds $T_3$ and $T_5$ linked to the detection threshold $T_1$ can be generated, as well as two detection thresholds $T_4$ and $T_6$ linked to the detection threshold $T_2$.

A temperature sensor according to the invention is also susceptible to diverse applications. By way of example, FIG. 20 represents diagrammatically an integrated circuit MC for a smart card, comprising a microprocessor based or wired-logic central unit UC, a memory MEM, and a sensor 20 or 30 according to the invention. The central unit CU applies the signal TST to the sensor 20, 30 during test periods. The signals $S_1$ to $S_4$ delivered by the sensor 20, 30 are accessible via a data bus DB.

That which is claimed is:

1. A temperature sensor integrated on a silicon chip and comprising:
   first threshold means for detecting a first temperature threshold of a temperature of the silicon chip, the first temperature threshold having a first detection threshold;
   second threshold means for detecting a second temperature threshold of the temperature of the silicon chip, the second temperature threshold having a second detection threshold;
   third threshold means for detecting a third temperature threshold of the temperature of the silicon chip, the third temperature threshold being between the first and second temperature thresholds, and having a third detection threshold linked with the first detection threshold so that a deviation of the first detection threshold causes a corresponding deviation of the third detection threshold; and
   fourth threshold means for detecting a fourth temperature threshold of the temperature of the silicon chip, the fourth temperature threshold being between the first and second temperature thresholds, and having a fourth detection threshold linked with the second detection threshold so that a deviation of the second detection threshold causes a corresponding deviation of the fourth detection threshold;
   the third and fourth temperature thresholds defining a temperature window to test the temperature sensor for detecting deviation of the first and second detection thresholds.

2. A temperature sensor according to claim 1, wherein the first temperature threshold is greater than the second temperature threshold while the third temperature threshold is less than the fourth temperature threshold.

3. A temperature sensor according to claim 1, wherein the first detection threshold is linked with the second detection threshold so that a deviation of the first detection threshold causes a corresponding deviation of the second detection threshold, and a deviation of the second detection threshold causes a corresponding deviation of the first detection threshold.

4. A temperature sensor according to claim 1, wherein two of said threshold means have detection thresholds linked when they have at least one common electrical element intervening in the detection of the temperature thresholds, the at least one common element comprising at least one of a current source, a resistor and a transistor.

5. A temperature sensor according to claim 1, wherein the temperature window is centered around a temperature within a range of about 20 to 30° C.

6. A temperature sensor according to claim 1, wherein the first temperature threshold is greater than 50° C., the second temperature threshold is less than 0° C., and the third and fourth temperature thresholds are within a range of about 0° C. and 50° C.

7. A temperature sensor according to claim 1, further comprising:
   signal means for delivering a first signal varying with temperature according to a first variation rule, a second signal varying with temperature according to a second variation rule, a third signal varying with temperature according to a third variation rule, and a fourth signal varying with temperature according to a fourth variation rule so that a deviation of the first signal implies a corresponding deviation of the third signal and a deviation of the second signal implies a corresponding deviation of the fourth signal;
   reference signal means for delivering at least one reference signal that does not vary or hardly varies with temperature; and
   compare means for comparing at least two of the four signals varying with temperature with the at least one reference signal, and delivering threshold detection signals for detecting an overshoot of at least two of the first, second, third and fourth temperature thresholds.

8. A temperature sensor according to claim 7, further comprising:
an input for receiving a selection signal for a detection threshold;
first select means for selecting the first or third signal varying with temperature according to a value of the selection signal;
second select means for selecting the second or fourth signal varying with temperature according to the value of the selection signal; and
wherein said compare means compares the selected first or third signal and delivers a first or third threshold detection signal for detecting an overshoot of the first or third temperature threshold, and compares the selected second or fourth signal and delivers a second or fourth threshold detection signal for detecting an overshoot of the second or fourth temperature threshold.

9. A temperature sensor according to claim 1, further comprising:
an input for receiving a selection signal for a detection threshold;
signal means for delivering a first or a third signal varying with temperature according to a value of the selection signal, and for delivering a second or a fourth signal varying with temperature according to the value of the selection signal;
reference signal means for delivering at least one reference signal that does not vary or hardly varies with temperature; and
compare means for comparing the delivered first or third signal with the at least one reference signal and delivering a first or third threshold detection signal for detecting an overshoot of the first or third temperature threshold, and for comparing the delivered second or fourth signal with the at least one reference signal and delivering a second or fourth threshold detection signal for detecting an overshoot of the second or fourth temperature threshold.

10. A temperature sensor according to claim 1, further comprising:
reference means for delivering a first reference signal that does not vary or hardly varies with temperature, a second reference signal that does not vary or hardly varies with temperature, a third reference signal that does not vary or hardly varies with temperature, a fourth reference signal that does not vary or hardly varies with temperature so that a deviation of the first signal implies a corresponding deviation of the third signal and a deviation of the second signal implies a corresponding deviation of the fourth signal;
signal means for delivering at least one signal varying with temperature; and
compare means for comparing each of the reference signals with the at least one signal varying with temperature, and delivering threshold detection signals for detecting an overshoot of the first, second, third and fourth temperature thresholds.

11. A temperature sensor according to claim 1, further comprising:
an input for receiving a selection signal for a detection threshold;
first select means for selecting the first or third reference signal according to a value of the selection signal;
second select means for selecting the second or fourth reference signal according to the value of the selection signal; and
compare means for comparing the selected first or third reference signal with at least one signal varying with temperature and delivering a first or third threshold detection signal for detecting an overshoot of the first or third temperature threshold, and comparing the second or fourth reference signal with the at least one signal varying with temperature and delivering a second or fourth threshold detection signal for detecting an overshoot of the second or fourth temperature threshold.

12. A temperature sensor according to claim 1, further comprising:
an input for receiving a selection signal for a detection threshold;
reference means for delivering a first or a third reference signal according to a value of the selection signal, and for delivering a second or a fourth reference signal according to the value of the selection signal; and
compare means for comparing the first or third reference signals with at least one signal varying with temperature and delivering a first or a third threshold detection signal for detecting an overshoot of the first or the third temperature threshold, and for comparing the second and fourth reference signals with the at least one signal varying with temperature and delivering a second or fourth threshold detection signal for detecting an overshoot of the second or fourth temperature threshold.

13. A temperature sensor integrated on a silicon chip and comprising:
a measurement circuit for
detecting a first temperature threshold of a temperature of the silicon chip, the first temperature threshold having a first detection threshold,
detecting a second temperature threshold of the temperature of the silicon chip, the second temperature threshold having a second detection threshold,
detecting a third temperature threshold of the temperature of the silicon chip, the third temperature threshold being between the first and second temperature thresholds, and having a third detection threshold linked with the first detection threshold so that a deviation of the first detection threshold causes a corresponding deviation of the third detection threshold, and
detecting a fourth temperature threshold of the temperature of the silicon chip, the fourth temperature threshold being between the first and second temperature thresholds, and having a fourth detection threshold linked with the second detection threshold so that a deviation of the second detection threshold causes a corresponding deviation of the fourth detection threshold,
the third and fourth temperature thresholds defining a temperature window to test the temperature sensor for detecting deviation of the first and second detection thresholds.

14. A temperature sensor according to claim 13, wherein the first temperature threshold is greater than the second temperature threshold while the third temperature threshold is less than the fourth temperature threshold.

15. A temperature sensor according to claim 13, wherein the first detection threshold is linked with the second detection threshold so that a deviation of the first detection threshold causes a corresponding deviation of the second detection threshold, and a deviation of the second detection threshold causes a corresponding deviation of the first detection threshold.

16. A temperature sensor according to claim 13, wherein the temperature window is centered around a temperature within a range of about 20 to 30° C.

17. A temperature sensor according to claim 13, wherein the first temperature threshold is greater than 50° C., the second temperature threshold is less than 0° C., and the third and fourth temperature thresholds are within a range of about 0° C. and 50° C.

18. A temperature sensor according to claim 13, wherein said measurement circuit delivers a first signal varying with temperature according to a first variation rule, a second signal varying with temperature according to a second variation rule, a third signal varying with temperature according to a third variation rule, and a fourth signal varying with temperature according to a fourth variation rule so that a deviation of the first signal implies a corresponding deviation of the third signal and a deviation of the second signal implies a corresponding deviation of the fourth signal, at least one reference signal that does not vary or hardly varies with temperature; and further comprising a comparator circuit for comparing at least two of the four signals varying with temperature with the at least one reference signal, and delivering threshold detection signals for detecting an overshoot of at least two of the first, second, third and fourth temperature thresholds.

19. A temperature sensor according to claim 18, further comprising:

an input for receiving a selection signal for a detection threshold;

a first select means for selecting the first or third signal varying with temperature according to a value of the selection signal;

a second select circuit for selecting the second or fourth signal varying with temperature according to the value of the selection signal; and wherein said comparator circuit compares the selected first or third signal and delivers a first or third threshold detection signal for detecting an overshoot of the first or third temperature threshold, and compares the selected second or fourth signal and delivers a second or fourth threshold detection signal for detecting an overshoot of the second or fourth temperature threshold.

20. A temperature sensor according to claim 13, further comprising an input for receiving a selection signal for a detection threshold;

wherein said measurement circuit delivers:

a first or a third signal varying with temperature according to a value of the selection signal, a second or a fourth signal varying with temperature according to the value of the selection signal, and at least one reference signal that does not vary or hardly varies with temperature; and further comprising a comparator circuit for comparing the delivered first or third signal with the at least one reference signal and delivering a first or third threshold detection signal for detecting an overshoot of the first or the third temperature threshold, and for comparing the delivered second or fourth signal with the at least one reference signal and delivering a second or fourth threshold detection signal for detecting an overshoot of the second or fourth temperature threshold.

21. A temperature sensor according to claim 13, wherein said measurement circuit delivers:

a first reference signal that does not vary or hardly varies with temperature, a second reference signal that does not vary or hardly varies with temperature, a third reference signal that does not vary or hardly varies with temperature, a fourth reference signal that does not vary or hardly varies with temperature so that a deviation of the first signal implies a corresponding deviation of the third signal and a deviation of the second signal implies a corresponding deviation of the fourth signal, and at least one signal varying with temperature; and further comprising a comparator circuit for comparing each of the four reference signals with the at least one signal varying with temperature, and delivering threshold detection signals for detecting an overshoot of the first, second, third and fourth temperature thresholds.

22. A temperature sensor according to claim 13, further comprising:

an input for receiving a selection signal for a detection threshold;

a first select circuit for selecting the first or third reference signal according to a value of the selection signal; and a second select circuit for selecting the second or fourth reference signal according to the value of the selection signal; and a comparator circuit for comparing the selected first or third reference signal with at least one signal varying with temperature and delivering a first or third threshold detection signal for detecting an overshoot of the first or the third temperature threshold; and comparing the second or fourth reference signal with the at least one signal varying with temperature and delivering a second or fourth threshold detection signal for detecting an overshoot of the second or fourth temperature threshold.

23. A temperature sensor according to claim 13, further comprising an input for receiving a selection signal for a detection threshold; wherein said measurement circuit delivers a first or a third reference signal according to a value of the selection signal, a second or a fourth reference signal according to the value of the selection signal, and at least one signal varying with temperature; and further comprising a comparator circuit for comparing the first or third reference signals with the at least one signal varying with temperature and delivering a first or third threshold detection signal for detecting an overshoot of the first or the third temperature threshold, and for comparing the second or fourth reference signals with the at least one signal varying with temperature and delivering a second or fourth threshold detection signal for detecting an overshoot of the second or fourth temperature threshold.

24. A method for testing detection thresholds of a temperature sensor integrated on a silicon chip delivering threshold detection signals for detecting an overshoot of at least two temperature thresholds, the temperature sensor having a first detection threshold for a first temperature threshold of a temperature of the silicon chip and a second detection threshold for a second threshold temperature of the temperature of the silicon chip, the method comprising:

offsetting the first detection threshold to obtain a third detection threshold for a third temperature threshold of the temperature of the silicon chip, the third temperature threshold being between the first and second temperature thresholds so that the third detection threshold is linked with the first detection threshold and a deviation of the first detection threshold causes a corresponding deviation of the third detection threshold;

offsetting the second detection threshold to obtain a fourth detection threshold for a fourth temperature threshold of the temperature of the silicon chip, the fourth temperature threshold being between the first and second temperature thresholds so that the fourth detection threshold is linked with the second detection threshold and a deviation of the second detection threshold causes a corresponding deviation of the fourth detection threshold; and observing the threshold detection signals delivered by the temperature sensor while adhering to a temperature window between the third and fourth temperature thresholds.

25. A method according to claim 24, wherein the first temperature threshold is greater than the second temperature threshold, and the third temperature threshold is less than the fourth temperature threshold.

26. A method according to claim 24, wherein the first and second detection thresholds are linked so that a deviation of the first detection threshold causes a corresponding deviation of the second detection threshold, and a deviation of the second detection threshold causes a corresponding deviation of the first detection threshold.

27. A method according to claim 24, wherein the temperature sensor is tested at a single temperature.

28. A method according to claim 24, wherein the temperature window is centered around a temperature within a range of about 20 to 30° C.

29. A method according to claim 24, wherein the first temperature threshold is greater than 50° C., the second threshold temperature is less than 0° C., and the third and fourth temperature thresholds are within a range of about 0° C. and 50° C.

30. A method according to claim 24, wherein offsetting the first or second detection thresholds comprises modifying a value of at least one electrical parameter in the temperature sensor, the at least one electrical parameter comprising at least one of a bias current and a resistor.

31. A method according to claim 24, wherein offsetting the first detection threshold to obtain the third detection threshold comprises:

detecting the first temperature threshold having the first detection threshold, and detecting the third temperature threshold having the third detection threshold linked with the first detection threshold so that the deviation of the first detection threshold causes the corresponding deviation of the third detection threshold; and wherein offsetting the second detection threshold to obtain the fourth detection threshold comprises:

detecting the second temperature threshold having the second detection threshold, and detecting the fourth temperature threshold having the fourth detection threshold linked with the second detection threshold so that the deviation of the second detection threshold causes the corresponding deviation of the fourth detection threshold.

32. A method according to claim 31, wherein the integrated temperature sensor comprises respective threshold detection means for detecting the temperature thresholds, wherein two of the threshold detection means have detection thresholds linked when they have at least one common electrical element intervening in the detection of the temperature thresholds, the at least one common electrical element comprising at least one of a current source, a resistor and a transistor.

33. A method according to claim 31, wherein the temperature sensor further comprises two multiplexed outputs driven by a threshold selection signal, one of the outputs delivering a first or third threshold detection signal for detecting an overshoot of the first threshold or third threshold, and a second or fourth threshold detection signal for detecting an overshoot of the second threshold or fourth threshold.

* * * * *